US007899694B1

(12) United States Patent  (10) Patent No.: US 7,899,694 B1
Marshall et al.  (45) Date of Patent: Mar. 1, 2011

(54) GENERATING SOLUTIONS TO PROBLEMS VIA INTERACTIONS WITH HUMAN RESPONDERS

(75) Inventors: Bradley E. Marshall, Bainbridge Island, WA (US); Christopher L. Scofield, Seattle, WA (US); Elmore Eugene Pope, Sammamish, WA (US); Eric B. Merritt, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 1277 days.

(21) Appl. No.: 11/479,861

(22) Filed: Jun. 30, 2006

(51) Int. Cl.
  *G06F 17/00* (2006.01)
(52) U.S. Cl. .......................................................... 705/7
(58) Field of Classification Search ........................ 705/7
  See application file for complete search history.

(56) References Cited

U.S. PATENT DOCUMENTS

| | | | |
|---|---|---|---|
| 5,455,875 A | 10/1995 | Chevion et al. | 382/311 |
| 5,465,308 A | 11/1995 | Hutcheson et al. | 382/159 |
| 5,495,412 A * | 2/1996 | Thiessen | 705/1.1 |
| 5,805,745 A | 9/1998 | Graf | 382/291 |
| 5,826,244 A | 10/1998 | Huberman | 705/37 |
| 5,848,393 A | 12/1998 | Goodridge et al. | 705/8 |
| 5,862,223 A | 1/1999 | Walker et al. | 380/25 |
| 5,937,388 A | 8/1999 | Davis et al. | 705/8 |
| 6,012,066 A | 1/2000 | Discount et al. | 707/103 |
| 6,032,151 A | 2/2000 | Arnold et al. | 707/103 |
| 6,041,306 A | 3/2000 | Du et al. | 705/8 |
| 6,044,355 A | 3/2000 | Crockett et al. | 705/8 |
| 6,078,916 A | 6/2000 | Culliss | 707/5 |
| 6,128,380 A | 10/2000 | Shaffer et al. | 379/265 |
| 6,163,607 A | 12/2000 | Bogart et al. | 379/266 |
| 6,173,053 B1 | 1/2001 | Bogart et al. | 379/266 |
| 6,181,343 B1 | 1/2001 | Lyons | 345/358 |
| 6,182,068 B1 | 1/2001 | Culliss | 707/5 |
| 6,223,165 B1 * | 4/2001 | Lauffer | 705/8 |
| 6,393,497 B1 | 5/2002 | Arnold et al. | 709/330 |
| 6,539,377 B1 | 3/2003 | Culliss | 707/5 |
| 6,546,087 B2 | 4/2003 | Shaffer et al. | 379/90.01 |
| 6,584,192 B1 * | 6/2003 | Agusta | 379/265.12 |
| 6,584,464 B1 | 6/2003 | Warthen | 707/4 |
| 6,587,556 B1 | 7/2003 | Judkins et al. | 379/219 |
| 6,603,854 B1 | 8/2003 | Judkins et al. | 379/265.06 |
| 6,636,590 B1 | 10/2003 | Jacob et al. | 379/114.05 |
| 6,704,403 B2 | 3/2004 | Lurie et al. | 379/114.1 |

(Continued)

OTHER PUBLICATIONS

U.S. Appl. No. 10/990,771, filed Nov. 16, 2004, Mortensen et al.

(Continued)

*Primary Examiner* — Thomas Dixon
(74) *Attorney, Agent, or Firm* — Seed IP Law Group PLLC

(57) ABSTRACT

Techniques are described for using multiple successive interactions with multiple responders in order to perform a variety of types of tasks, such as to generate solutions to abstract or conceptual problems. In some situations, at least some of the multiple responders are humans available to perform tasks and/or provide information, such as to provide responses to questions in exchange for payment. The multiple successive interactions with the responders may be used to iteratively refine the problem and its abstract intermediate solutions until the refinements are sufficiently detailed and tangible as to allow detailed final solutions to be generated. In some situations, the interactions with the responders may be performed as part of an automated service for generating solutions to a variety of types of problems, such as in exchange for payment from the users or others who specify the problems.

46 Claims, 7 Drawing Sheets

U.S. PATENT DOCUMENTS

| | | | |
|---|---|---|---|
| 6,707,904 B1 | 3/2004 | Judkins et al. | 379/265.06 |
| 6,763,104 B1 | 7/2004 | Judkins et al. | 379/265 |
| 6,859,523 B1 | 2/2005 | Jilk et al. | 379/32.01 |
| 6,938,048 B1 | 8/2005 | Jilk et al. | 707/102 |
| 6,985,872 B2 * | 1/2006 | Benbassat et al. | 705/8 |
| 7,155,400 B1 | 12/2006 | Jilk et al. | 705/9 |
| 7,197,459 B1 | 3/2007 | Harinarayan et al. | 704/270.1 |
| 7,231,322 B2 | 6/2007 | Kenworthy | |
| 2002/0069079 A1 | 6/2002 | Vega | 705/1 |
| 2002/0083079 A1 * | 6/2002 | Meier et al. | 707/104.1 |
| 2002/0184176 A1 * | 12/2002 | Fromherz et al. | 706/45 |
| 2003/0078852 A1 | 4/2003 | Shoen et al. | 705/26 |
| 2003/0200156 A1 | 10/2003 | Roseman et al. | 705/27 |
| 2003/0204449 A1 | 10/2003 | Kotas et al. | 705/27 |
| 2005/0132324 A1 | 6/2005 | Guyette | |
| 2005/0209819 A1 | 9/2005 | Wehrs et al. | |
| 2006/0248504 A1 | 11/2006 | Hughes | |

OTHER PUBLICATIONS

U.S. Appl. No. 10/990,949, filed Nov. 16, 2004, Cohen et al.
U.S. Appl. No. 10/990,951, filed Nov. 16, 2004, Cohen et al.
U.S. Appl. No. 10/991,339, filed Nov. 16, 2004, Cohen et al.
U.S. Appl. No. 11/479,350, filed Jul. 31, 2007, Scofield et al.
"About Spending," retrieved Nov. 23, 2004, from http://www.mypoints.com/mp/dstatial.show?isref=nmhp.popup.aboutspending.default, 1 page.
"Earning Points with MyPoints," retrieved Nov. 23, 2004, from http://www.mypoints.com/mp/dstatial.show?isref=nmhp.popup.aboutearning.default, 1 page.
"FAQs," retrieved Nov. 23, 2004, from http://www.mypoints.com/mp/dstatial.show?isref=nmhp.popup.faq.default, 1 page.
"Frequently Asked Questions about the Open Mind Initiative," retrieved Nov. 16, 2004, from http://vvww.openmind.org/FAQs.html, 3 pages.
"Frequently Asked Questions," TrueDater FAQ's, retrieved Apr. 4, 2005, from http://www.truedater.com/index.php?action=faqs, 2 pages.
"Grid—The Competitive Advantage," Aug. 2004, retrieved Jun. 9, 2005, from http://www.sun.com/solutions/documents/articles/grid_adv_aa.xml?null, 2 pages.
"Join MyPoints Now," retrieved Nov. 23, 2004, from http://www.mypoints.com/?MCK=ccb67d8c41a3819b, 4 pages.
"JUnit Test Infected: Programmers Love Writing Tests," retrieved May 17, 2006, from http://junit.sourceforge.net/doc/testinfected/testing.htm, 13 pages.
"Payment-On-Line (AOL, Compuserve, INTERNET, etc)," Oct. 20, 1994, retrieved Dec. 6, 2004, from http://groups-beta.google.com/group/misc.entrepreneurs/browse_thread/thread/80fcfl10252bb3f7/ff1c8, 3 pages.
"The ESP Game," retrieved Jun. 8, 2005, from http://www.espgame.org, 1 page.
"What is BonusMail®?," retrieved Nov. 23, 2004, from http://www.mypoints.com/mp/dstatial.show?isref=nmhp.popup.bonusmail.default, 1 page.
"What is Keen," retrieved Jun. 8, 2005, from http://www.keen.com/documents/homepage/wik_pop.asp?TID=gbFOnFLPstnUuFonMtBmHw, 1 page.
"What is MyPoints," retrieved Nov. 23, 2004, from http://www.mypoints.com/mp/dstatial.show?isref=nmhp.popup.whatis.default, 1 page
About, Inc., "Intelligent Agents," retrieved Jun. 9, 2005, from http://psychology.about.com./od/intelligentagents/, 5 pages.
About, Inc., "Our Story," retrieved Jun. 9, 2005, from http://ourstory.about.com/, 2 pages.
About, Inc., Welcome to About.com, retrieved Jun. 9, 2005, from http://www.about.com, 2 pages.
Applied Skills & Knowledge, LLC, "Make Skills-Based Routing Happen," Jun. 3, 2003, retrieved from http://www.appliedskills.com/whitepapers/files/Skills-basedRouting.pdf, 3 pages.
Barlas, D., "Hipbone Connects to Kana," Jan. 5, 2004, retrieved Jun. 8, 2005, from http://www.line56.com/print/default.asp?ArticleID=5255, 1 page.
Beck, K., et al., "JUnit Cookbook," retrieved May 17, 2006, from http://junit.sourceforge.net/doc/cookbook/cookbook.htm, 3 pages.
Calishain, T., "Yahoo! Service Offers More Advice than Expertise," May 6, 2002, retrieved Jul. 16, 2004, from http://www.infotoday.com/newsbreaks/nb020506-1.htm, 2 pages.
distributed.net, "distributed.net History & Timeline," retrieved Jun. 8, 2005, from http://www.distributed.net/history.php, 7 pages.
distributed.net, "The Organization." retrieved Jun. 8, 2005, from http://www.distributed.net/, 2 pages.
Doan, A., "MongoMusic Fans Include Microsoft," Sep. 9, 2000, Forbes.com, retrieved Jun. 9, 2005, from http://www.forbes.com/2000/09/09/feat2.html, 3 pages.
DuBaud, S., "Advice Site Resort to Legal Counsel," Jan. 4, 2002, retrieved Apr. 29, 2004, from http://news.com.com/2011-1088-801359.html, 3 pages.
Elance Inc., Elance Online™—Everyday Outsourcing™, retrieved Jun. 9, 2005, from http://www.elance.com/c/static/main/displayhtml.pl?file=eol.html&module=home, 2 pages.
Elance, Inc., "Elance History," retrieved Jun. 8, 2005, from http://www.elance.com/c/static/main/displayhtml.pl?file=heritage.html, 3 pages.
eLancer homepage, retrieved Jun. 8, 2005, from http://www.elancer.us/, 2 pages.
Epinions, Inc., Epinions.com homepage, retrieved Jun. 9, 2005, from http://www.epinions.com, 2 pages.
Fox, S., "Can New Technology Revolutionize the Net?," Jun. 1, 2000, CNET.com, retrieved Jun. 8, 2005, from http://web.archive.org/web/20001018221958/www.cnet.com/insider/0-121949-7-1995365.html, pp. 1-3, 3 pages.
Get a Freelancer.com homepage, retrieved Jun. 8, 2005, from http://www.getafreelancer.com, 3 pages.
gonesilent.com homepage, Aug. 22, 2000, retrieved Jun. 8, 2005, from http://web.archive.org/web/20000822122731/www.gonesilent.com/about.html, 2 pages.
Google—Answers, "Ask a question, Set your Price. Get your Answer.," retrieved Jun. 9, 2005, from http://answers.google.com/answers/, 1 page.
Google, "Your Computer's Idle Time is too Precious to Waste," retrieved Jun. 9, 2005, from http://toolbar.google.com/dc/offerdc.html, 1 page.
Gunn, S., "Hey, buddy, can you spare some cycles?," Sep. 24, 1997, retrieved Jun. 8, 2005, from http://www.cnn.com/TECH/9709/24/netly.news/, 4 pages.
Hagel, J. et al., "Go Slowly with Web Services," Feb. 15, 2002, CIO.com retrieved from http://www.cio.com/archive/021502/keynote.html, 4 pages.
Hagel, J., et al., "Your Next IT Strategy," *Harvard Business Review R0109G:* 105-113, Oct. 2001, 11 pages.
Hagel, J., *Out of the Box—Strategies for Achieving Profits today and Growth Through Web Services*, Harvard Business School Publishing, Boston, Massachusetts, 2002, Front Cover through Acknowledgements, Chapter 1, "Responding to Unmet Needs," and Chapter 2, "Web Services Create New Options," pp. i-xix and 1-42, 33 pages.
Ingenio, Inc., Ingenio™ homepage, retrieved Jun. 8, 2005, from http://www.ingenio.com/default.asp?TF=1, 2 pages.
Ingenio, Inc., Introducing Ingenio™ Pay Per Call™, retrieved Jun. 8, 2005, from http://www.ingenio.com/documents/corp/home.asp, 2 pages.
Ingenio, Inc., KEEN—Your Personal Advisor, retrieved Jun. 8, 2005, from http://www.keen.com, 2 pages.
Ingenio, Inc., KEEN—Your Personal Advisor/Get Advice, retrieved Jun. 8, 2005, from http://www.keen.com/categories/get_answers.asp/?SRCHT=0&search=&gid=0, 1 page.
Jupitermedia Corporation, "About jGuru.com: Overview," retrieved Jun. 9, 2005, from http://vvww.jguru.com/misc/about-overview.jsp, 2 pages.
Jupitermedia Corportion, jGuru homepage, retrieved Jun. 9, 2005, from http://www.jguru.com, 5 pages.
KANA Inc., "Corporate Overview," retrieved Jun. 8, 2005, from http://www.kana.com/about/about.aspx, 2 pages.

Katz, J., et al., "The Benefits of a Virtual Contact Center," MCI, Inc., May 2004, retrieved from http://global.mci.com/us/enterprise/insight/whitepapers/pdf/VirtualContactCtr.pdf, 7 pages.

Kenexa, "Call Centers," retrieved Jun. 8, 2005, from http://www.kenexa.com/ind_callcent.html, 3 pages.

Lynn, R., "Keeping Online Daters Honest," Apr. 1, 2005, retrieved on Apr. 4, 2005, from http://www.wired.com/news/print/0,1294,67083,00.html, 3 pages.

Mabel, J., "Project Lifecycles: Waterfall, Rapid Application Development, and All That," Dec. 21, 2003, Lux Group, Inc., retrieved Jul. 31, 2007, from http://web.archive.org/web/20031221115436/www.lux-seattle.com/resources/whitepapers/waterfall.htm, 9 pages.

Massive Multiplayer Online Role-Playing Game—homepage, retrieved Jun. 8, 2005, from http://www.mpog.com, 2 pages.

Microsoft Corporation, "Microsoft Acquires MongoMusic," Sep. 13, 2000, retrieved Jun. 9, 2005, from http://www.microsoft.com/presspass/press/2000/sept00/mongopr.mspx, 2 pages.

Mori, G., et al., "Breaking a Visual CAPTCHA," retrieved Jun. 8, 2005, from http://www.cs.berkeley.edu/~mori/gimpy/gimpy.html, 4 pages.

Morris, D., "JUnit Automates Java Testing," Nov. 6, 2003, IT Jungle, OS/400 Edition, vol. 2, No. 22, retrieved May 17, 2006, from http://www.itjungle.com/mpo/mpo110603-story01.html, 8 pages.

Mossberg, W., "GuruNet as a Reference Tool Goes Beyond Search Engines," Mar. 6, 2003, retrieved Jul. 20, 2004, from http://ptech.wsj.com/archive/ptech-20030306.html, 3 pages.

Multiplayer Online Games Directory—homepage, retrieved Jun. 8, 2005, from http://www.mpogd.com, 1 page.

Nortel Networks, "Beyond ACD- The advantages of Skill-based Routing in Today's Contact Centers," Mar. 7, 2003, retrieved from http://www.nortelnetworks.com/solutions/ccvp/collateral/nn103640-030703.pdf, 12 pages.

Online Multiplayer Games Network—homepage, retrieved Jun. 8, 2005, from http://www.omgn.com, 2 pages.

Project Gutenberg's Distributed Proofreaders—homepage, retrieved Jun. 9, 2005 from http://www.pgdp.net/c/default.php, 4 pages.

Rhodes, B., "The Wearable Remembrance Agent: A System for Augmented Memory," Appeared in *Personal Technologies Journal Special Issue on Wearable Computing 1*: 218-224, 1997, retrieved Jun. 9, 2005, from http://www.bradleyrhodes.com/Papers/wear-ra-personaltech/, 10 pages.

SERENA Software, Inc., "Serena™ Automating Change," retrieved Jun. 9, 2005, from http://www.serena.com, 1 page.

SETI Institute homepage, retrieved Jun. 9, 2005, from http://www.seti.org/site/pp.asp?c=ktJ2J9MMIsE&b=178025, 3 pages.

Siebel Systems, Inc., Siebel homepage, retrieved Jun. 8, 2005, from http://www.siebel.com/. 3 pages.

Singh, P., "Open Mind: common sense—Teaching computers the stuff we all know," retrieved Jun. 9, 2005, from http://commonsense.media.mit.edu/cgi-bin/search.cgi, 2 pages.

Singh, P., "The Open Mind Common Sense Project," Jan. 2, 2002, retrieved Jun. 9, 2005, from http://www.kurzweilai.net/articles/art0371.html, pp. 1-24, 24 pages.

Spice, B., "CMU Student Taps Brain's Game Skills," Oct. 5, 2003, retrieved Jun. 8, 2005, from http://www.post-gazette.com/pg/03278/228349.stm, 5 pages.

Spogg.com—homepage, retrieved Jun. 8, 2005, from http://www.spogg.com, 2 pages.

Sun Microsystems, Inc., "Products & Technologies—Java Technology," retrieved Jun. 9, 2005, from http://java.sun.com, 2 pages.

Sun Microsystems, Inc., "The Jini Technology Series: JavaSpaces Principles, Patterns, and Practice," retrieved Jun. 9, 2005, from http://java.sun.com/docs/books/jini/javaspaces/, 2 pages.

TopCoder, Inc., TopCoder homepage, retrieved Jun. 8, 2005, from http://www.topcoder.com/, 2 pages.

University of California, "What is SETI@home?," retrieved Jun. 9, 2005, from http://setiathome.ssl.berkeley.edu./, 1 page.

Wilson, B. "Anti-Social Software," Apr. 30, 2004, retrieved Aug. 26, 2005, from http://www.brendonwilson.com/profile/000156.shtml, 5 pages.

Wolverton, T., et al., "Yahoo Launches Advice Site," Apr. 29, 2002, CNET News.com, retrieved Apr. 29, 2004, from http://news.com.com/2102-1017_3-894968.html?tag+st.util.print, 2 pages.

WHQL Testing—Wikipedia, retrieved on Aug. 10, 2010 from http://web.archive.org/web/20060528021831/http://en.wikipedia.org/wiki/WHQL_Testing, 1 page.

* cited by examiner

| | Request(s) | Input(s) | Response(s) |
|---|---|---|---|
| 204a | Provide Software Requirements | General software description | R1, R2, R3, R4, R5 |
| 204b | Evaluate Requirements | R1, R2, R3, R4, R5 | Multiple ratings |
| 204c | Provide Design Specification | R2, R3, R5 | S1, S2, S3, S4 |
| 204d | Evaluate Design Specifications | S1, S2, S3, S4 | Multiple ratings |
| 204e | Decompose Design | S2 | [M1, M2]<br>[M3, M4, M5]<br>[M1, M6, M7] |
| 204f | Evaluate Decompositions | [M1, M2]<br>[M3, M4, M5]<br>[M1, M6, M7] | Multiple ratings |
| 204g | Create Test Code | M1, M6, M7 | T1.1, T1.2, T6.1, T6.2, T6.3, T7.1, T7.2, T7.3 |
| 204h | Create Implementation Code | M1, M6, M7 | I1.1, I1.2, I1.3, I6.1, I7.1, I7.2 |
| 204i | Evaluate Implementation Code and Test Code | [I1.1, T1.1],<br>[I1.1, T1.2],<br>...<br>[I7.2, T7.3] | Multiple results |
| 204j | Build System | [I1.2, I6.1, I7.1] | Final system |

Fig. 2

GENERATING SOLUTIONS TO PROBLEMS VIA INTERACTIONS WITH HUMAN RESPONDERS

CROSS REFERENCE TO RELATED APPLICATIONS

This application is related to U.S. patent application Ser. No. 11/479,350, filed concurrently and entitled "Creating Computer Software Via Interactions With Human Responders", which is hereby incorporated by reference in its entirety.

TECHNICAL FIELD

The following disclosure relates generally to techniques for facilitating the generation of solutions to problems, such as via multiple successive interactions with multiple human responders who assist in refining aspects of the problems to be solved.

BACKGROUND

Historically, in order to perform most non-trivial tasks, individuals and companies have turned to specialized groups of people that have joined together to perform particular tasks. For example, if a company exists to produce particular consumer goods, the company would typically hire and maintain groups of workers who were specially trained to design and/or manufacture such goods, or would instead contract out one or more such operations to external groups (e.g., a product design firm, a manufacturing operation, etc.) that were similarly organized and trained. By forming and maintaining such specialized groups, some types of operational costs may be reduced, such as the repeated costs of identifying or training appropriate personnel each time that a task is to be performed.

While some types of benefits may result from the creation and maintenance of specialized groups of people for performing particular types of tasks, a variety of inefficiencies with such approaches also exist. For example, if a particular type of task is needed by a company only occasionally, it may be impractical for the company to maintain a particular group of people that are specialized for that task. Instead, the company may maintain people for the primary tasks performed by the company, and may outsource other types of tasks by hiring third-party groups or individuals that have expertise in the other types of tasks—such specialized third-party groups or individuals may often be able to perform those tasks at a cost lower than the cost that the company would have incurred to perform such tasks itself. As one particular example, many companies may occasionally need specialized software to assist in the operation of the company, but may not maintain a group of software developers who are able to produce such software—in such cases, the company may hire a third-party software development group that will produce appropriate custom software for the company.

However, such outsourcing of tasks also suffers from various limitations. For example, significant time and costs may be needed to identify external groups that are qualified to perform a particular task, as well as to manage a selected external group through various stages of performance of a non-trivial task. In addition, outsourcing may be less effective in contexts where the task or operation being outsourced is not well-defined, such as a product design task that involves developing a product from initial concept to detailed manufacturing specification.

As use of the Internet and the World Wide Web ("the Web") have become increasingly prevalent, the costs for performing some types of interactions between individuals and companies have decreased. For example, if a company or individual is able to create and provide a detailed definition of a small piece of computer software, Web sites exist where a software contractor may be hired to produce the computer software. More generally, other Web sites have been created where an individual or company may obtain various types of information for a fee, such as by hiring an expert in a particular area to provide indicated information, or by submitting a question to a company that employs experts to provide answers in one or more areas. However, such existing Web sites may be of use in only the limited situations for which those Web sites have been created, and similarly suffer from various of the other limitations related to outsourcing.

BRIEF DESCRIPTION OF THE DRAWINGS

FIG. 2 illustrates an example of creating computer software via successive interactions with multiple human responders.

DETAILED DESCRIPTION

Figure 1A:
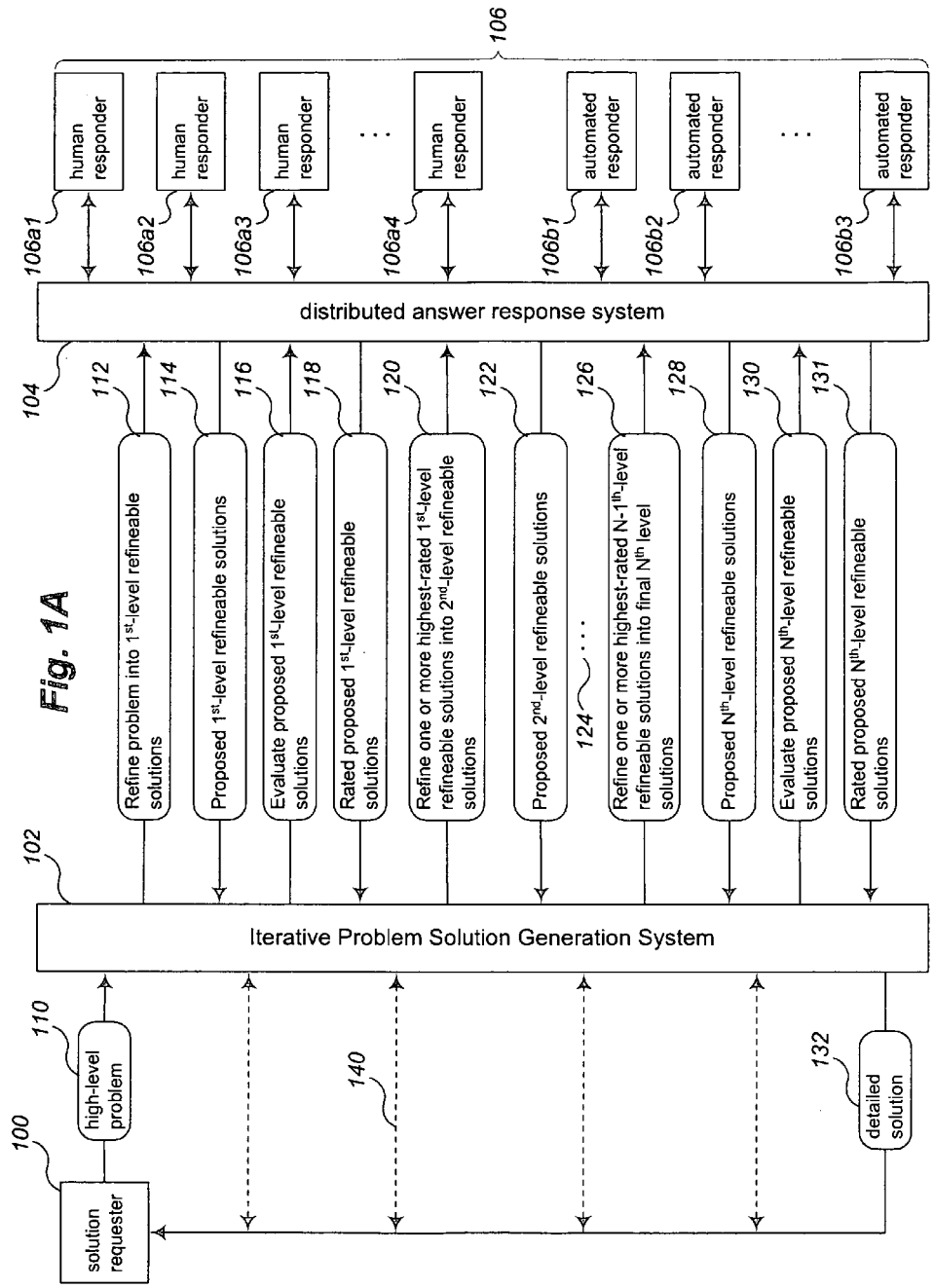
FIGS. 1A-1B and 3 illustrate examples of generating solutions to problems via successive interactions with multiple human responders.

Techniques are described for using multiple successive interactions with multiple human responders in order to perform a variety of types of tasks. The multiple successive interactions with the human responders may be performed in at least some embodiments as part of an automated service for generating solutions to a variety of types of problems, such as by performing multiple interactions with various humans to iteratively refine a problem until the refined problem is sufficiently detailed and non-abstract that a solution may be generated by the humans. The multiple successive interactions with the human responders may further be performed in at least some embodiments as part of an automated service for creating a variety of types of computer software, such as by performing multiple interactions with various humans to iteratively refine a high-level architecture or general problem statement until detailed specifications are produced from which computer software modules may be created. Additional details regarding performing a variety of types of tasks with respect to generation of problem solutions and with respect to creation of computer software are included below.

In some embodiments, the multiple human responders are part of a distributed group of humans who are unrelated to each other, such as humans who elect to interact with one or more Web sites or other electronic services in order to provide information in exchange for payment (e.g., to provide responses to questions that are submitted). In at least some such embodiments, different humans may participate in different interactions with regard to a particular task that is being performed, thus enabling the aggregate knowledge and judgment of many disparate humans to be combined with respect to performing the particular task. In addition, the humans that participate in interactions with regard to a particular task may in some embodiments have particular expertise with respect to the task and/or the particular interactions in which they participate, while in other embodiments at least some of the humans that participate in at least some interactions with regard to at least some tasks may lack any particular expertise with respect to the task and the particular interactions in which they participate. Additional details regarding human responders and types of interactions with the human responders are included below.

As previously noted, in at least some embodiments multiple successive interactions with human responders may be used to generate a solution to a problem. For example, a user may specify a problem that is sufficiently abstract that an appropriate solution cannot be discerned without refinement to further define the problem, such as if a final solution is desired that is sufficiently detailed to be implementable or otherwise actionable by the user. In such a situation, a solution to the abstract problem may be generated by using multiple successive interactions with human responders to iteratively refine the problem and its solution. For example, starting with the initial abstract problem, multiple human responders may be requested to provide proposed refinements. Next, multiple human responders may be requested to further refine at least some of the proposed refinements, with the human responders who perform the further refinement being potentially distinct from the human responders who previously provided the proposed refinements. The further refinements may in turn be successively refined by additional interactions with multiple responders, until a final detailed solution to the initial abstract problem is identified. In some embodiments, responders may also be utilized to further influence the refinement of the problem and its solution by providing evaluations of intermediate proposed refinements, such that only a subset of the highest evaluated proposed refinements are selected for further refinement. In addition, the determination as to when a given problem and its solution has been sufficiently refined may be made in various ways in various embodiments, including based on feedback received from human responders, input from a user that supplied the problem, objective criteria that are automatically or manually applied, etc.

Figure 1B:
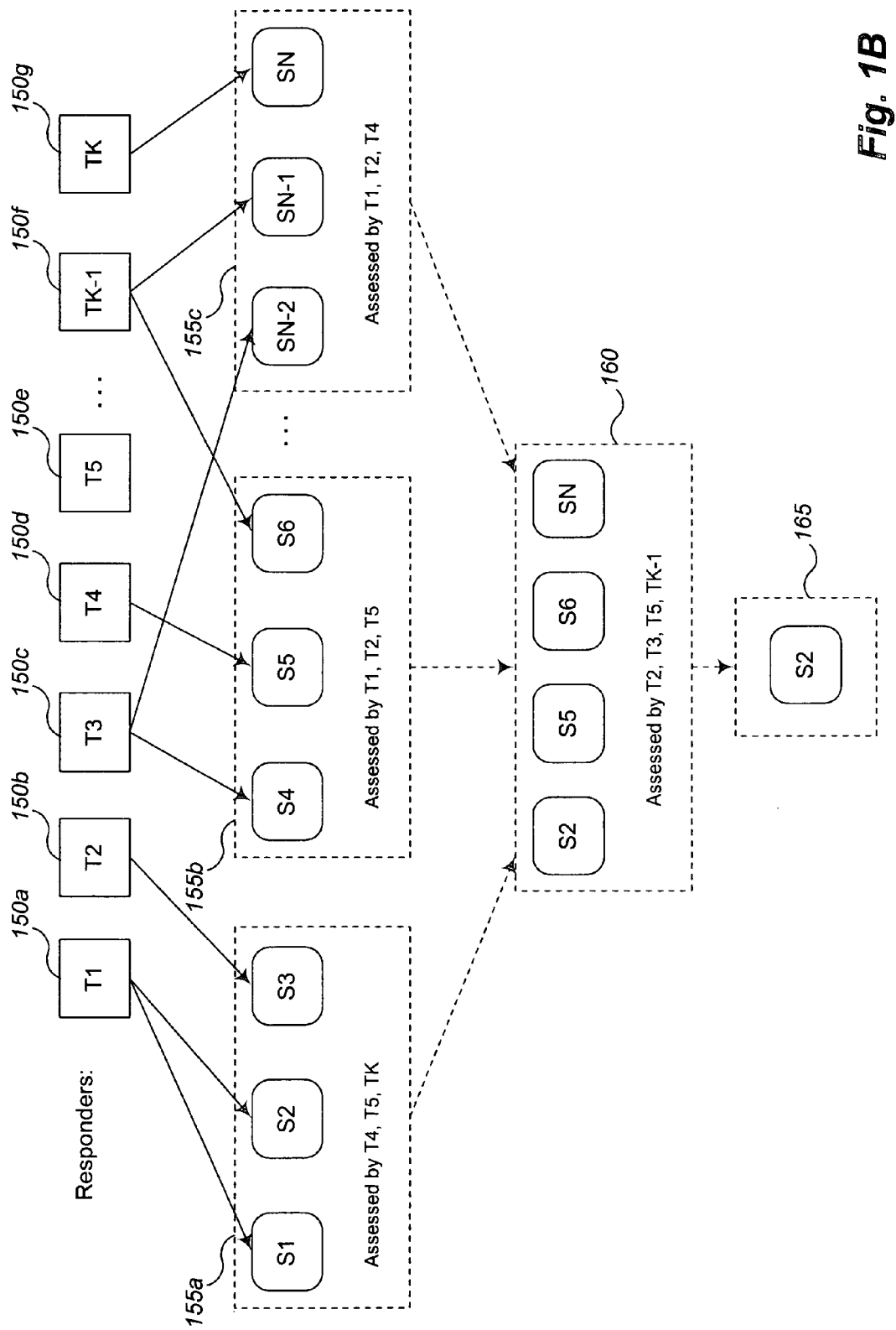

FIGS. 1A-1B illustrate examples of generating solutions to problems via repeated interactions with human responders who assist in iteratively refining the problems and their solutions. For illustrative purposes, some embodiments are described below in which particular types of problems and solutions are used, and in which the solutions are generated in particular ways. However, it will be understood that the described techniques may be used in a variety of other embodiments and situations, and that the invention is thus not limited to the exemplary details provided.

In particular, FIG. 1A illustrates an example embodiment in which an Iterative Problem Solution Generation system 102 provides automatic functionality for generating solutions to specified problems based on multiple interactions with multiple human responders. For the purposes of this example, the types of interactions that are performed are emphasized, and the specific details of the problem, its intermediate solutions and its final solution are not described. Additional details related to various types of problems are included below, including with respect to FIG. 3. The interactions in FIG. 1A occur over a period of time, such that interactions shown lower on the page occur after interactions shown higher on the page. In addition, in this example the Iterative Problem Solution Generation system interacts with the multiple human responders by using a distributed answer response system 104 that in turn interacts with multiple human responders 106, although in other embodiments the Iterative Problem Solution Generation system may instead interact directly with some or all of the multiple human responders.

In this example, the process begins when a solution requester 100 submits a high-level abstract problem 110 for which a detailed final solution is desired. The solution requester 100 may be a human user of the Iterative Problem Solution Generation system, or instead may be an automated system or process. In response to the received high-level problem 110, the Iterative Problem Solution Generation system generates a request 112 for an initial solution to the high-level problem 110. For a high-level abstract problem, the initial solution may be an abstract solution that is further refineable, such as by including or resulting in one or more sub-problems that are more detailed than the initial high-level problem. The request 112 is received by the distributed answer response system 104, which provides the request to one or more of the responders 106. The distributed answer response system 104 then receives one or more responses to the request 112 from at least one of the responders 106, with each response in this example including at least one initial first-level solution to the problem that is further refineable. The received first-level refineable solutions are then forwarded as proposed first-level refineable solutions 114 to the Iterative Problem Solution Generation system 102.

Next, in this example the Iterative Problem Solution Generation system 102 acts to evaluate at least some of the proposed first-level refineable solutions, such as all of the proposed first-level refineable solutions or only those proposed first-level refineable solutions that satisfy one or more specified criteria (e.g., that are specified in a particular format and that include one or more particular types of information). In particular, the Iterative Problem Solution Generation system 102 sends an evaluation request 116 for the proposed first-level refineable solutions of interest to the distributed answer response system 104, which provides the request to one or more of the responders 106 (who may in at least some embodiments be distinct from the responders who provided the proposed first-level refineable solutions). Responses to the evaluation request 116 may have various forms in various embodiments, such as ratings, rankings, and/or other objective or subjective assessments of one or more aspects (e.g., quality, desirability, etc.) of the proposed first-level refineable solutions, and with the evaluations being relative to or instead independent of other proposed first-level refineable solutions. Furthermore, in at least some embodiments the evaluations may further provide other types of information regarding the proposed first-level refineable solutions, such as whether the solutions are sufficiently detailed to be actionable or otherwise have one or more other characteristics of interest. Additional details related to evaluation of proposed solutions are provided below. After the distributed answer response system 104 receives one or more evaluation responses to the request 116 from at least one of the responders 106, the ratings or other evaluations are forwarded as rated proposed first-level refineable solutions 118 to the Iterative Problem Solution Generation system 102.

In this example, the Iterative Problem Solution Generation system 102 then uses the received ratings 118 to select one or more of the proposed first-level refineable solutions to further refine, such as to select a subset of the highest rated proposed first-level solutions. For example, a ranking of the proposed first-level refineable solutions may be generated based on one or more characteristics evaluated by the responders 106 (e.g., in a weighted manner to reflect multiple characteristics and/or information about the responders who provide the evaluations), and proposed first-level refineable solutions may be selected for further use if they are among a specified number of the highest ranked solutions or are otherwise above a specified threshold.

After one or more proposed first-level refineable solutions are selected for further refinement into next-level refineable solutions, the Iterative Problem Solution Generation system generates a request 120 to refine those first-level refineable solutions into second-level refineable solutions. The request 120 is received by the distributed answer response system 104, which provides the request to one or more of the responders 106 (who may in at least some embodiments be distinct from the responders who provided the proposed first-level refineable solutions and/or the responders who provided evaluations of the proposed first-level refineable solutions). Next, the distributed answer response system 104 receives one or more responses to the request 120 from at least one of the responders 106, with each response including at least one second-level refineable solution. The second-level refineable solutions received by the distributed answer response system 104 are then forwarded as proposed second-level refineable solutions 122 to the Iterative Problem Solution Generation system 102.

In this example, additional interactions 124 may optionally occur between the Iterative Problem Solution Generation system 102 and the distributed answer response system 104, such as interactions to perform one or more further successive refinements of some or all of the second-level refineable solutions. The additional interactions 124 many include interactions such as those described above, such as requests to refine a given refineable solution into one or more proposed next-level refineable solutions, responses that include proposed next-level refineable solutions, requests to evaluate proposed refineable solutions, and ratings or other evaluations of proposed refineable solutions.

Eventually, the Iterative Problem Solution Generation system 102 in this example selects one or more $N-1^{th}$-level refineable solutions for further refinement into $N^{th}$-level refineable solutions. Then, in interactions similar to those described above, the Iterative Problem Solution Generation system 102 sends requests 126 for refinement of the $N-1^{th}$-level refineable solutions into proposed $N^{th}$-level refineable solutions, which are provided in responses 128. Next, the Iterative Problem Solution Generation system requests evaluations 130 of at least some of the proposed $N^{th}$-level refineable solutions, which are provided in ratings 131. Based on the received ratings 131, the Iterative Problem Solution Generation system 102 then identifies one of the proposed $N^{th}$-level refineable solutions as a detailed final solution 132 to the high-level problem 110, and provides the final solution to the solution requester 100. In other embodiments, more than one final solution may instead be provided to the solution requester, such as to allow the solution requester to choose between multiple alternative provided final solutions.

Various techniques may be used in various embodiments to determine when a solution to a high-level problem has been sufficiently refined to be a final solution that is sufficiently detailed and/or non-abstract. For example, some embodiments may perform a user-specified or pre-determined number (e.g., 10) of refinements, and then use the last refinement as a final solution. In other embodiments, the determination may be based at least in part on input from the solution requester. For example, the Iterative Problem Solution Generation system 102 may perform one or more interactions 140 with the solution requester 100 at various times, such as, for example, to allow the solution requester to indicate whether to continue refining a group of proposed refineable solutions, and if so to select which proposed refineable solutions to further refine. In other embodiments, the determination of when a solution to a high-level problem has been sufficiently refined may be based at least in part on feedback received from one or more responders, such as by using responses to an evaluation request in which one or more responders 106 provide evaluations as to whether to continue refining one or more proposed refineable solutions.

In this example, the responders 106 include multiple unrelated human responders 106a1-106a4, although it will be appreciated that numerous human responders (e.g., thousands or millions) may be available in some embodiments, and that human responders may be able to provide responses in a variety of forms (e.g., to provide answers to questions that are difficult to express in machine-readable form and/or difficult for computer systems to perform). In general, the human responders may use various knowledge and skills when providing responses, including their human perception, reasoning, cognition, judgment, etc. In addition, in the illustrated example the responders 106 include multiple automated responders 106b1-106b3 that are capable of providing responses to requests received from the distributed answer response system 104 (e.g., requests of particular types that are specified in agreed-upon formats), and some of the received responses may be provided by the automated responders. The automated responders 106b1-106b3 may, for example, be computer systems or other devices capable of automatically responding to requests received from the distributed answer response system 104. In other embodiments, no automated responders may be used. Furthermore, the distributed answer response system 104 may provide mechanisms such that computing systems may programmatically interact with it in order to provide requests and/or responses, such as via one or more APIs ("Application Programming Interfaces"). For example, the illustrated requests and responses between the Iterative Problem Solution Generation system 102 and the distributed answer response system 104 may be programmatically expressed and communicated. Additional details related to example techniques and/or systems for interacting with users to provide requests (e.g., indicating tasks to be performed) and to receive responses (e.g., containing corresponding task performance results) are included in U.S. patent application Ser. No. 10/990,949, filed Nov. 16, 2004, and entitled "Providing An Electronic Marketplace To Facilitate Human Performance Of Programmatically Submitted Tasks," which is hereby incorporated by reference in its entirety.

While not illustrated in detail here, the interactions between the solution requester and the Iterative Problem Solution Generation system may be performed in various manners in various embodiments. For example, if the solution requester is a human user, the user may interact with a Web-based or other type of interactive interface provided by the Iterative Problem Solution Generation system, or instead at least some of the interactions may be performed using a message-based exchange of information (e.g., via email, instant messages, voicemail messages using IVR, or Interactive Voice Response, etc.) or using other programmatic interactions via a defined API provided by the Iterative Problem Solution Generation system. In addition, in at least some embodiments the functionality of the Iterative Problem Solution Generation system may be provided on a fee-based basis to large numbers of solution requesters (e.g., in a simultaneous manner), such as by obtaining payment from a solution requester before initiating the solution generation process for them or before providing the generated final solution to them.

Similarly, the interactions with the distributed answer response system 104 and/or the multiple responders may also be performed on a fee-based basis, such as to provide payment or other compensation to responders that participate in any part of the iterative solution generation process or instead to those whose responses are used as part of the generation of a particular final solution. Various additional aspects of the solution-generation process are discussed below.

FIG. 1B provides additional details regarding an example of using multiple responders to evaluate proposed solutions to a problem in a distributed manner, such as to facilitate further refinement and/or selection of a preferred final solution. In this example, an initial set of multiple N proposed solutions S1-SN is decomposed into multiple subsets that are each evaluated by one or more responders. Multiple responders 150*a-g* (labeled T1-TK, respectively) are shown, and are available to perform evaluations of proposed solutions in this example. Arrows pointing to each of the proposed solutions from one of the responders indicate the responder who provided the proposed solution—in this example, each proposed solution has a single responder, although in other embodiments multiple responders may be associated with a proposed solution (e.g., if the multiple responders worked together to jointly create the proposed solution, or if the multiple responders instead each independently provided the proposed solution), and each responder may be able to provide only a single proposed solution. In this example, responder T1 provides proposed solutions S1 and S2, responder T2 provides proposed solution S3, responder TK provides proposed solution SN, etc., and some responders (such as responder T5) do not provide any of these proposed solutions.

In this example, the evaluation of the initial set of proposed solutions S1-SN begins by decomposing the proposed solutions into multiple subsets 155*a-c*. Each subset 155*a-c* contains multiple proposed solutions, such as subset 155*b* that has solutions S4-S6. In some embodiments, the number of proposed solutions in a given subset will approximately equal the number of proposed solutions in every other subset. In addition, in some embodiments there will be a relatively small number (e.g., 10 or less) of proposed solutions per subset. The relative sizes of the subsets (e.g., with respect to other subsets and/or the initial set) may impact statistical accuracy, and as such may be determined based on various factors, such as the length of time that a responder may be expected to take to evaluate one or more proposed solutions (e.g., complex or highly-detailed proposed solutions may take more time to assess), psychometric factors (e.g., limits on human perceptual ability to distinguish or individuate items in large data sets), etc. In addition, some embodiments may attempt to decompose an initial set such that multiple proposed solutions provided by a single responder do not reside in the same subset (e.g., to prevent proposed solutions S1 and S2 provided by responder T1 from both being members of subset 155*a*).

Each of the multiple subsets 155*a-c* is then assigned to one or more responders for evaluation. In particular, in this example subset 155*a* is assigned to responders T4, T5, and TK; subset 155*b* is assigned to responders T1, T2, and T5; and subset 155*c* is assigned to responders T1, T2, and T4. In some embodiments, a responder who provided a proposed solution in a subset will not be assigned to evaluate that subset. Such an approach may improve statistical accuracy by, for example, reducing a potential source of biased evaluations. In addition, some embodiments may attempt to at least approximately equalize the number of times each responder may perform an evaluation, so as to minimize the impact of differing evaluation standards used by particular responders.

Next, each responder assesses the proposed solutions in their assigned subsets. In some embodiments, the responders may be directed to base their evaluations on one or more particular characteristics (e.g., quality, performance, robustness, extensibility, completeness, aesthetics, etc.) by, for example, providing corresponding evaluation criteria to the responders. Evaluations from the responders may be indicated in various ways, including via responses that include scores or other ratings of each of the proposed solutions, a relative ordering of proposed solutions (e.g., from best to worst, from worst to best, etc.) and/or a predetermined number (e.g., the top three) of proposed solutions.

One or more proposed solutions from each subset may then be identified for further evaluation based on the evaluations performed by the responders. In the illustrated example, the initial set of proposed solutions S1-SN is reduced to a subset 160 containing only proposed solutions S2, S5, S6, and SN, such as based on those proposed solutions receiving evaluations above a threshold, or being the top four evaluated proposed solutions (where in this example four may have been a pre-selected number). Various embodiments may take different approaches to the number of proposed solutions that advance for further evaluation under varying conditions. For example, some embodiments may advance multiple proposed solutions (e.g., the top two) from each subset in order to, for example, reduce the risks associated with randomly placing multiple high-quality proposed solutions in a single subset.

The selection process is next applied to subset 160, and in this example will be evaluated by responders T2, T3, T5 and TK−1. While some of the evaluation responders of subset 160 in this example overlap with evaluation responders from the prior evaluation of subsets 155*a-c*, such as responders T2 and T5, in other examples different evaluation responders may be used in each evaluation round. In addition, in some cases subset 160 may be much larger than is illustrated, and may again be decomposed into multiple subsets that may be subjected to further rounds of evaluation. The determination to decompose may be based on various factors, including a maximum preferred subset size, the cost of performing additional rounds of evaluation, the time required to perform additional evaluation rounds, etc. Based on the obtained evaluations of the proposed solutions in subset 160, proposed solution S2 is identified as the most appropriate proposed solution 165.

Other embodiments may employ variations of the described technique of distributed evaluation. For example, some embodiments may afford some proposed solutions a "second chance," such that highly rated proposed solutions that are not identified for advancement may be re-evaluated in order to identify one or more such proposed solutions to advance for further evaluation. In addition, after a first round of evaluation, it may be desirable in some cases to attempt to distribute more highly rated proposed solutions into separate, next-round subsets (e.g., top-ranked proposed solutions are placed in separate subsets). Such a strategies may minimize effects related to the placement of multiple high quality proposed solutions in a single assessment subset (e.g., where a "winner take all" approach would result in possibly high-quality proposed solutions being eliminated from contention early in the process). In addition, distributed evaluation may proceed with varying levels of human intervention and/or input. For example, in some embodiments the number of proposed solutions that advance from a given subset into a next round of evaluation, as well as other operational parameters (e.g., the number of proposed solutions per subset, etc.), may be determined based on user input prior to the distributed evaluation process. Other embodiments may request user input under certain conditions (e.g., for the purposes of tie-breakers, to adjust operational parameters between rounds of evaluation, etc.). In addition, some embodiments may not create subsets containing multiple proposed solutions for evaluation. Rather, such embodiments may assign individual proposed solutions to responders for evaluation by, for example, providing a rating or grade (e.g. from 1 to 10) for each individual proposed solution without comparison to any other proposed solutions. Then, such ratings may be aggregated (e.g., average grades calculated) and utilized as a basis for selection (e.g., selecting the proposed solutions with the top 10 grades).

Thus, as previously described, various automated techniques may be used to generate solutions to specified problems based on multiple interactions with multiple human responders, and the interactions with responders may occur in various ways. For example, the responders may include human responders who use computing systems or other communication devices to provide responses. In some embodiments, the responders may be distributed, such that they are geographically remote from one another and potentially unrelated to each other, and may be disparate humans that vary widely in abilities and knowledge. In some embodiments, a distributed answer response system may be utilized to manage and/or otherwise facilitate interaction with multiple responders, such as a system that provides functionality for identifying and tracking requests, identifying and tracking responders, matching responders with appropriate requests (e.g., by providing responders with the ability to search for requests and/or automatically assigning requests to particular responders based on qualifications, such as education, training, experience, etc.), facilitating payments to responders for provided responses, etc.

In addition, as previously noted, the described techniques may be used to produce solutions to a wide variety of types of problems. For example, a non-exclusive list of examples of types of problems may include product design, product development, product testing, software creation, creation of marketing materials and campaigns, research projects, etc. In addition, problems may be specified at various levels of detail, such as via a partial specification in general abstract terms that will be fully specified based on the interactions with the human responders. In addition, a given problem may have multiple possible solutions of varying form, completeness, and/or type, and one or more final solutions may be selected based on input from the provider of the problem and/or feedback from human responders. In general, a refinement to a problem or intermediate solution may include a partial or complete solution, and may include a more detailed description of the problem, one or more additional sub-problems to be solved, etc. Accordingly, a given refinement of a first problem may be utilized as a second problem to be solved via further refinement.

Figure 3:
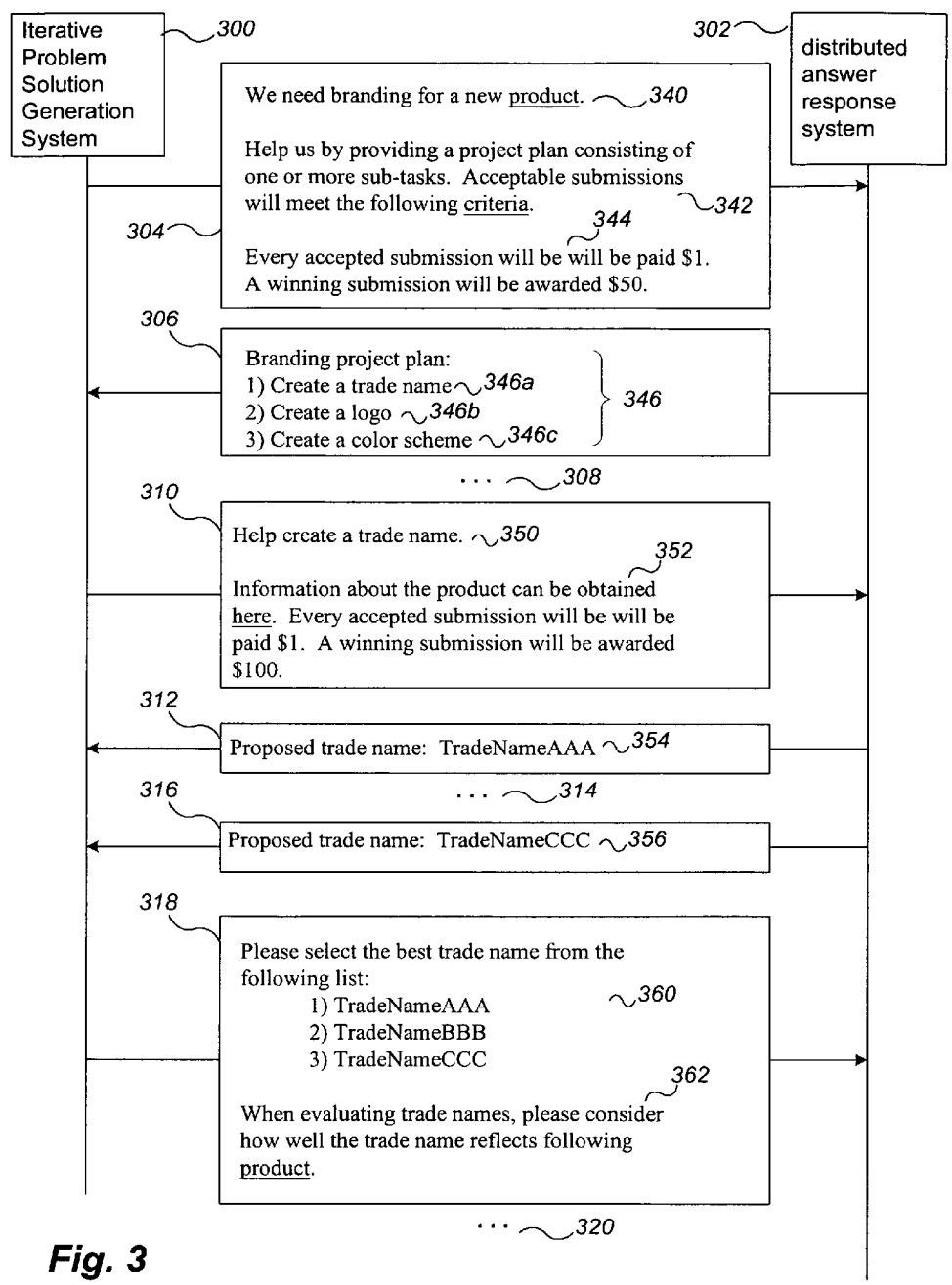

FIG. 3 illustrates an example of generating a solution to one particular type of problem via repeated interactions with responders. In particular, the example problem in FIG. 3 relates to creating branding information for a new product, and FIG. 3 depicts multiple iterations of refinements to produce a solution to the problem. In this example, embodiments of the Iterative Problem Solution Generation system and the distributed answer response system interact, such as systems similar to the Iterative Problem Solution Generation system 102 and distributed answer response system 104 of FIG. 1, respectively. For the sake of clarity, some elements shown in FIG. 1, such as the responders and the solution requester, have been omitted. In FIG. 3, time proceeds downward, such that lower interactions (e.g., response 306) occur later in time than higher interactions (e.g., request 304).

Initially, the Iterative Problem Solution Generation system 300 in FIG. 3 generates a request 304 to refine a high-level problem into first-level refineable solutions, such as in response to a request from a solution requester user (not shown), and sends the request to the distributed answer response system 302. The request 304 includes a description of the high-level problem 340, which in this example is to generate appropriate branding for a new product. The description of the high-level problem 340 includes instructions 342 indicating a project plan to be completed and a reference (e.g., a URL, or "Uniform Resource Locator") for accessing remote information about the product to be branded and criteria for providing solutions. The instructions 342 describe the general form of the expected proposed refineable solution, which should include a project plan that describes one or more sub-tasks that can be performed in order to create the product brand. The criteria for an acceptable proposed refineable solution may include constraints on size (e.g., minimum and/or maximum word count), form (e.g., preferred file formats for documents and/or images), the number of proposed refineable solutions that may be provided per responder, time constraints (e.g., a date and/or time by which submissions must be received), etc. The request 304 also includes payment terms 344 in this example, which indicate that accepted proposed refineable solutions will be awarded $1.00 and that the winning proposed refineable solution will be awarded $50.00. In some embodiments, acceptable proposed refineable solutions may be any that meet indicated criteria, such as those provided by instructions 342, and such acceptance criteria may be sufficiently well defined to allow an automatic determination by the Iterative Problem Solution Generation system regarding whether to accept a given proposed refineable solution. In other embodiments, acceptance of proposed refineable solutions may involve human input, such as by using one or more responders to check or otherwise verify that a given submission is acceptable based on specified subjective and/or objective criteria.

The request 304 is received by the distributed answer response system 302, which then uses one or more responders (not shown) to obtain at least one proposed refineable solution 306 that is returned to the Iterative Problem Solution Generation system 300. In this example, the proposed refineable solution 306 includes a project plan 346 with three subtasks that include creating a trade name 346a, creating a logo 346b, and creating a color scheme 346c. Optional additional interactions 308 may include multiple other proposed refineable solutions for request 304 that are similarly provided to the Iterative Problem Solution Generation system, as well as interactions related to evaluating proposed refinements.

In the illustrated example, the proposed refineable solution 306 is selected as a basis for further refinement, resulting in the generation of a request 310 to refine the first sub-task 346a identified in the project plan 346 of the proposed refineable solution 306. The request 310 includes a description of the problem 350, as well as instructions and payment terms 352. The description of the problem requests the creation of a trade name that may be used to identify the product indicated by the instructions 352.

The request 310 is received by the distributed answer response system 302, which then uses one or more responders to obtain multiple alternative proposed refineable solutions 312, 314, and 316 that are forwarded to the Iterative Problem Solution Generation system 300. Each of the proposed refineable solutions includes a proposed trade name, such as trade name 354 and trade name 356, although in some situations some proposed refineable solutions may incorrectly fail to include the requested information (e.g., may include a general description about attributes that a trade name should have, but fail to actually propose a particular trade name).

Next, the Iterative Problem Solution Generation system 300 generates an evaluation request 318 in order to obtain evaluations of multiple proposed refineable solutions. In this example, the request 318 includes instructions 360 to select a best trade name from an indicated list of three proposed trade names. The request 318 also includes instructions 362 that provide subjective criteria for evaluating a trade name on the basis of how well it reflects the indicated product.

Additional interactions 320 follow that are not illustrated in detail. The additional interactions 320 may include a number of responses to the evaluation request 318 that may be used by the Iterative Problem Solution Generation System 300 to select a final trade name, or to select one or more of the three proposed trade names for further refinement. Additional interactions 320 may also include interactions related to the other two subtasks 346b and 346c of project plan 346, such as requests, responses and evaluations related to creating a logo 346a and to creating a color scheme 346c, and such additional interactions may occur before, after, or concurrent with the illustrated interactions 310, 312, 314, 316 and 318. After a final solution to the initial abstract problem 304 is generated, such as a solution that includes a particular trade name, logo and color scheme, information about the final solution is made available to the solution requester and/or others.

Thus, as previously described, various automated techniques may be used to generate solutions to a wide variety of types of problems. In some embodiments, additional specialized techniques may be used in order to solve particular types of problems. For example, in some embodiments additional techniques are employed to use multiple successive interactions with human responders as part of creating a variety of types of computer software. These techniques may be automatically performed by an Iterative Software Creation system (e.g., a particular embodiment of the Iterative Problem Solution Generation system that is specialized to perform tasks involving creation of computer software), and may include automatically using multiple human responders to perform various software development tasks that include analysis (e.g., defining system requirements or otherwise identifying desired features and functionality), design (e.g., producing specifications), implementation (e.g., implementing a design as a computer program or portion thereof), testing (e.g., verifying an implementation with respect to a design), etc.

FIG. 2 illustrates an example of creating computer software via repeated interactions with multiple responders, such as may be performed by an embodiment of the Iterative Software Creation system (not shown). In particular, FIG. 2 illustrates a table 200 comprising rows 204a-j that each depict one or more requests 202a related to software development tasks using particular inputs 202b, as well as one or more corresponding responses 202c. The illustrated requests may be made by, for example, an embodiment of the Iterative Software Creation system, and the illustrated responses may be provided by, for example, an embodiment of a distributed answer response system. In the illustrated example, time proceeds downwards such that requests and responses depicted in lower rows (e.g., row 204h) occur later in time than those that are depicted in higher rows (e.g., row 204c). While requests and responses are illustrated as occurring synchronously and in a particular order, in other embodiments requests may be made in an order different from the one illustrated (e.g., some requests may be made in parallel and/or subsequent requests may be made without waiting for all of the illustrated responses).

In this example, the software development tasks performed during the multiple interactions with the multiple human responders involve multiple sequential phases, starting with analysis (e.g., gathering requirements), design (e.g., developing specifications), implementation (e.g., producing code that implements specifications), and testing (e.g., verifying implementations with respect to specifications). Such phases may be specified by an embodiment of the Iterative Software Creation system that is controlling the software creation, by a user who submits a particular computer software creation problem, and/or based on the responses from multiple human responders. Each phase results in the production of software development items, such as requirements, designs, specifications, test cases, and/or source code, which may then be used in subsequent phases of development. In other embodiments, various other software development methodologies may be used, including based on rapid prototyping, agile development, spiral models, rapid application development, iterative development, extreme programming, etc. In addition, while the following example illustrates the use of Java-like pseudo-code as an implementation and specification language, other formal or informal languages may be used as a basis for communication and expression in other embodiments.

In this example, row 204a of table 200 illustrates an initial request made during an initial analysis phase in order to obtain software requirements for a piece of computer software to be developed, as well as multiple responses received for the request. The initial request may include, for example, a high-level or abstract description of desired functionality, a high-level or abstract description of a desired purpose, and/or an abstract or conceptual goal to be satisfied, along with a request to the responders to supply one or more software requirements for corresponding computer software. In this illustrated example, computer software to perform multiple-choice exam grading is being created, and the example request of row 204a may include the following text:

Provide requirements for multiple-choice exam grading computer software. Valid responses (those satisfying minimum criteria) will be rewarded $0.25, and selected responses that are used will be rewarded $10.00.

In other embodiments, requests may include varying amounts of detail regarding the format and/or content of the requested responses, and rewards or other compensation (if any) may be provided in other manners. In this example, minimum criteria for a valid response may be used, such as a minimum and/or maximum number of words, and/or that the responses be presented using notation and/or guidelines of a particular software development methodology (e.g., user and/or system use cases described using UML, or "Unified Modeling Language", notation), although in other embodiments other types of criteria or no such criteria may be used (e.g., if all responses receive compensation, or if the responses to receive compensation are selected in other manners, such as based on evaluations by human responders and/or by a solution requester user who specified the problem). In addition, in at least some embodiments the responders who are allowed to respond to a particular request may be limited in various ways, such as based on a determination by the Iterative Software Creation system or the Iterative Problem Solution Generation system to limit responses to a particular number of responders, to only human or only automated responders, to only responders that have indicated qualifications or other characteristics, to only responders that have not participated in one or more other indicated interactions for the same problem being solved or computer software being generated, etc.

In the illustrated example, a total of five requirements R1-R5 are received in response to the example request of row 204a, as shown in column 202c. Examples of the five requirements R1-R5 received as the responses of row 204a follow:

R1: Score exams
R2: Score a group of exams
R3: Obtain statistics related to a group of exam scores, including average score, minimum score, standard deviation, etc.
R4: Email students their exam scores
R5: Obtain a histogram of a group of exam scores In other embodiments, requirements may be specified in greater or lesser degrees of detail. For example, requirements may include user narratives and/or graphic figures. Note also that there overlap or similarities may exist between at least some of the requirements, such as requirements R1 and R2, such as to reflect requirements received from distinct responders who are unaware of one another or of the responses from other responders.

After the responses of row 204a have been received, the received requirements may be evaluated to select particular requirements to be used for the computer software being created, such as to eliminate duplicate and/or less important requirements. Row 204b depicts an evaluation request related to the received requirements R1-R5, as well as multiple evaluation responses in the form of ratings. An example request of row 204b may include the following text:

Rank the following requirements for exam-grading computer software in order from best to worst:
R1: Score exams
R2: Score a group of exams
R3: Obtain statistics related to a group of exam scores, including average score, minimum score, standard deviation, etc.
R4: Email students their exam scores
R5: Obtain a histogram of a group of exam scores
Valid responses will be rewarded $0.05. You may only vote only once.

As is described elsewhere, a variety of other types of evaluations may be used in other embodiments, and valid evaluation responses may be determined in various ways (e.g., based on satisfying specified criteria, based on input from human responders and/or a solution requester user who supplied the problem, by treating all evaluation responses as valid, etc.). In addition, in some embodiments the proposed requirements may be categorized by the human responders or in other manners prior to evaluation, as described in greater detail elsewhere.

In the illustrated example, multiple responses that each rate the five requirements R1-R5 are received, such as the following example response:

R1, R4, R5, R2, R3

The above response orders the five requirements, in order from best to worst, as R1, R4, R5, R2, and R3. In some cases, the responses may be formatted or otherwise presented in machine-readable format (e.g., in XML, or "eXtensible Markup Language"), such that they can be automatically read or otherwise processed.

The five requirements R1-R5 are then automatically evaluated on the basis of the ratings contained in the received evaluation responses of row 204b. For example, an average ordering may be calculated by aggregating all of the received ratings, and a subset of the top requirements may be selected (e.g., the top three requirements, the top 50% of the requirements, etc.). As discussed in greater detail elsewhere, ratings or other evaluations from multiple human responders may be aggregated in various ways (e.g., in a weighted manner to reflect aspects of the evaluations or information about the responders), and external input (e.g., for a solution requester user who initially requested that the computer software be generated) may additionally be used. In the present example, three requirements are selected, those being R2, R3, and R5.

After the requirements for the multiple-choice exam grading computer software have been selected, computer software that meets the selected requirements may be designed, as shown in rows 204c-f that illustrate requests and responses as part of an exemplary design phase. In general, a design phase may involve one or more refinement steps, such as to perform multiple iterations in which a design is successively refined and/or decomposed until the design is sufficiently detailed to allow implementation of particular software code to proceed. The decision as to when to proceed to implementation may be made in various ways, such as based on input from the responders and/or a solution requester. However, for sake of clarity, in the illustrated example the design phase is broken down into a two-step process, with a high-level design specification first being created (as illustrated in rows 204c-d), and with a decomposition of the high-level design specification into detailed code module specifications being generated (as illustrated in rows 204e-f). A particular code module to be produced from a detailed code module specification may have a variety of forms in various embodiments, including procedures, functions, routines, subroutines, scripts, applets, classes (e.g., defined in an object oriented programming language), files (e.g., containing other modules such as procedures), programs, libraries, archives, components, etc. Modules may further include data and/or instructions expressed in various formats, including binary (e.g., machine instructions), text (e.g., source code), etc.

In this example, row 204c depicts a request to provide a high-level design specification for multiple-choice exam grading computer software based on the selected requirements, and the responses to the request. The example request of row 204c includes the following text:

Provide a high-level design specification for computer software that fulfills the following requirements:
1) Score a group of exams
2) Provide statistics related to a group of exam scores
3) Provide a histogram of a group of exam scores
Valid responses will be rewarded $5.00, and the best response will be rewarded $100.

The example request of row 204c identifies the selected requirements R2, R3, and R5, and offers indicated rewards for corresponding design specifications.

In the illustrated example, four responses that each include one of four design specifications S1-S4 are obtained, with a portion of an example of one of the received design specifications as follows:

```
interface ExamGrader {
    void gradeExams(Input i);
    void printStatistics(Output o);
    void displayHistogram(Graphics g);
    ...
}
```

In this example, the illustrated design specification is expressed using Java-like pseudo-code to specify an interface describing top-level functionality of the computer software. In other embodiments, the design specification may be expressed in various other ways, including figures (e.g., class diagrams, interaction diagrams, state charts, component diagrams, object hierarchies, user interface mockups, etc.), formal languages, and/or informal descriptions.

After the responses of row 204c have been obtained, the received design specifications may be evaluated to select one or more design specifications for further refinement, such as a single best design specification, or multiple alternative design specifications to be used to obtain alternative code module specifications for comparison. Row 204d depicts multiple evaluation responses received for the received specifications S1-S4, with an example of the request for row 204d as follows:

Please select the best design specification from the following list:
1) Design Specification #1
2) Design Specification #2
3) Design Specification #3
4) Design Specification #4
Valid responses will be rewarded $0.15. You may only vote only once.

In other embodiments, not all of the proposed design specifications may be evaluated, such as if not all of them satisfied one or more minimum criteria. In the illustrated example, the list of design specifications does not include the complete contents of the various specifications, but instead provide references to remotely accessible information (e.g., via URLs), such that responders may view one or more documents and/or other information resources that are representations of the indicated design specification. In other embodiments, varying amounts of information regarding the designs to be evaluated may be provided.

In the illustrated example, proposed specification S2 is selected on the basis of multiple evaluation responses. As previously noted, in some embodiments development may be "forked" at this point or at other points during the development process, such that multiple alternatives may be pursued in parallel in order to generate alternative refinements.

Row 204e next depicts a request to decompose the selected high-level design specification into one or more detailed code module specifications, as well as responses received to the request. The example request of row 204e may include the following text:

Provide interface definitions for modules of computer software that implement the following high-level specification (Design Specification #2):
// Spec id: S2
interface ExamGrader {
    void gradeExams(Input i);
    void printStatistics(Output o);
    void displayHistogram(Graphics g);
    . . .
}
Valid responses will be rewarded $3.00, and the best response will be rewarded $60.

In the illustrated example, three responses are obtained that each include a decomposition of the high-level specification into one or more interface definitions for one or more modules. In the illustrated example, each decomposition is shown as a tuple or group with one or more identifiers that each represent an interface definition of a single module. For example, the decomposition [M1, M2] provides two code module definitions M1 and M2 that each correspond to a distinct module. In some cases, multiple decompositions may both reference one or more of the same modules, such as with decompositions [M1, M2] and [M1, M6, M7] both referencing module M1. This may occur, for example, when standard interfaces such as those provided by system libraries are utilized as a basis for implementation, or when the same responder contributes at least a portion of both decompositions. An example portion of decomposition [M1, M6, M7] follows:

interface Exam {
    void add (int question, char answer);
    int getNumQuestions( );
    int getScore( );
    void grade(AnswerKey key);
    . . .
}
interface ExamGroup {
    void add(Exam exam);
    void grade(AnswerKey key);
    double getAverageScore( );
    int getMaxScore( );
    int getNumScores(int score);
    . . .
}
interface Histogram {
    void generate(ExamGroup exams);
    void display(Graphics g);
    . . .
}

This example response includes three interfaces named Exam, ExamGroup, and Histogram, corresponding to modules M1, M6, and M7, respectively. In other embodiments, the interfaces may be expressed in various other ways, including using formal or informal interface description languages, such as Interface Definition Language ("IDL") or Web Services Description Language ("WSDL").

After the responses of row 204e have been obtained, the received decompositions may be evaluated to select one or more particular decompositions that will form the basis for further refinement, such as to result in actual corresponding code modules being implemented. In particular, row 204f depicts a request to evaluate the received decompositions [M1, M2], [M3, M4, M5], and [M1, M6, M7], as well as multiple received evaluation responses. The example evaluation request of row 204f may include the following text:

Please select the best design specification decomposition from the following list:
1) Decomposition [M1, M2]
2) Decomposition [M3, M4, M5]
3) Decomposition [M1, M6, M7]
Responses will be rewarded $0.25. You may only vote only once.

In a manner similar to that previously discussed, the list of decompositions in the illustrated example uses URLs or other mechanisms that allow responders to browse and otherwise access the details of a given decomposition.

In the illustrated example, decomposition [M1, M6, M7] is selected for further refinement on the basis of multiple evaluation responses that are received in response to the request of row 204f. In some cases, additional rounds of refinement may follow, in which a selected decomposition is further decomposed and/or refined until a decomposition is determined to be ready for implementation (e.g., until there are no further details that need to be supplied in order to implement all of the specified modules).

After the design has been decomposed into module definitions that are ready to be implemented, computer software code modules that implement the module definitions may be created. In addition, in this example embodiment, computer software test modules are also created for each of the module definitions, and will be used for automated testing and evaluation of the proposed computer software code modules. Rows 204g-i illustrate the requests made and responses received during an exemplary implementation phase. In general, an implementation phase may involve multiple additional steps, the number of which may or may not be pre-determined, such as multiple iterations in which an implementation is successively refined and/or improved. However, for sake of clarity, in the illustrated example the implementation phase is broken down into a three-step process, as follows: first, test code modules are created for use in verifying implementation code modules; second, implementation code modules are created that implement the various module definitions; and third, the obtained test code modules are used to evaluate the obtained implementation code modules (and optionally vice versa). The creation of test code modules is illustrated in row 204g, the creation of implementation code modules is illustrated in row 204h, and the evaluation of the implementation code modules is illustrated in row 204i. Note that the software development tasks of creating test code modules and creating implementation code modules may in at least some cases be performed in parallel, although they are shown as occurring sequentially in FIG. 2 for purposes of simplification.

Row 204g depicts requests to create test code modules corresponding to the module definitions of the selected decomposition, as well as responses received to the requests. In the illustrated example, separate requests are made for each module of the selected decomposition, those being M1, M6, and M7, although in other embodiments a single request may be made to provide test code modules corresponding to one or more of the three module specifications. An example request of row 204g may include the following text:

Provide a unit test for the following module:
        // Module id: M1
        interface Exam {
            void add (int question, char answer);
            int getNumQuestions( );
            int getScore( );
            void grade(AnswerKey key);
            . . .
        }
    Valid responses will be rewarded $2.00, and the best response will be rewarded $25.

In the illustrated example, eight responses to the requests of row 204g are received. Each response includes a unit test that is denoted TN.K, indicating the K-th unit test received that may be utilized to test the N-th module. For example, unit test T6.2 is the second unit test received for module M6. In the illustrated example, two unit tests are received for module M1 (T1.1 and T1.2), three unit tests are received for module M6 (T6.1, T6.2, and T6.3), and three unit tests are received for module M7 (T7.1, T7.2, and T7.3). A portion of an example received unit test of row 204g follows:

class ExamTest extends TestCase {
        void testAdd( ) { . . . }
        void testGetNumQuestions( ) { . . . }
        . . .
    }

In this example, the illustrated response includes an implementation of a unit test class ExamTest that may be utilized to test an implementation of the Exam interface. Such tests may be used in the context of an automated or semi-automated testing framework, such as JUnit. In other embodiments, various other types of tests may be requested, including user-interface tests, performance tests, and/or integration tests. As such, tests may also be represented in various manners, including informal testing protocols, user interface test scripts, etc.

Row 204h depicts requests to create implementation code modules corresponding to the module definitions of the selected decomposition, as well as responses received to the requests. In the illustrated example, separate requests are made for each module of the selected decomposition, those being M1, M6, and M7, although in other embodiments a single request may be made to provide implementation code modules corresponding to one or more of the three module specifications. An example request of row 204h may include the following text:

Provide an implementation for the following interface:
        // Module id: M1
        interface Exam {
            void add (int question, char answer);
            int getNumQuestions( );
            int getScore( );
            void grade(AnswerKey key);
            . . .
        }
    Valid responses will be rewarded $4.00, and the best response will be rewarded $50.

In this example, the request is for code modules that implement the Exam interface.

In the illustrated example, six responses are received that each include a software implementation code module. Each module implementation is denoted as IN.K, indicating the K-th implementation received for the N-th module. For example, component I7.2 is the second implementation received for module M7. In the illustrated example, three implementations are received for module M1 (I1.1, I1.2, and I1.3), one implementation is received for module M6 (I6.1), and two implementations are received for module M7 (I7.1 and I7.2). A portion of a received example module implementation of row 204h follows:

class ExamImpl implements Exam {
        HashSet questions=new HashSet( );
        void add (int question, char answer) {
            questions.add(new Integer(question), new Char(answer));
        }
        int getNumQuestions( ) {
            return questions.size( );
        }
        int getScore( ) { . . . }
        void grade(AnswerKey key) { . . . }
        . . .
    }

In this example, the illustrated response includes a class ExamImpl that implements the Exam interface, with the ExamImpl class providing member functions that implement the specified functions of the Exam interface.

After the test code modules and implementation code modules have been received, the received implementation code modules may be evaluated. In this example embodiment, the evaluation of the implementation code modules based on the test code modules is performed by the human responders as part of the multiple interactions, but in other embodiments may be performed in a partially or fully automated manner. For example, one of various unit testing frameworks (e.g., JUnit) may be used if the test code modules and implementation code modules are appropriately specified, such as to evaluate each implementation code module using every corresponding test code module in order to determine the implementation code modules that most successively perform the various tests (and/or to identify areas of refinement for one or more implementation code modules in order to fix problems that cause those implementation code modules to fail one or more tests). Such automated testing may also be used in at least some embodiments to evaluate the test code modules (e.g., to identify the test code modules that most successfully test corresponding implementation code modules, such as by causing the most failures in the implementation code modules), such as if compensation to human responders who provide test code modules is based at least in part on selecting the best test code modules.

In this example, row 204*i* depicts requests to evaluate the received test and implementation code modules, as well as responses received for the requests. In the illustrated example, the received implementation code modules are evaluated with respect to the corresponding received test code modules, and the received test code modules are evaluated with respect to the received implementation code modules. In addition, each implementation code module may be tested against each corresponding test code module. For example, in the case of module M7, three test code modules (T7.1, T7.2 and T7.3) and two implementation code modules (I7.1 and I7.2) were received, resulting in 6 total combinations as follows: T7.1 and I7.1, T7.1 and I7.2, T7.2 and I7.1, T7.2 and I7.2, T7.3 and I7.1, and T7.3 and I7.2. In the illustrated example, separate requests are made for each testing combination, although in other embodiments only a single request may be made. An example request of row 204*i* may include the following text:

Execute test T7.1 on module implementation I7.2.
Responses will be rewarded $0.10.

The example request of row 204*i* offers $0.10 for executing test T7.1 on module implementation I7.2. In some cases, the specified tests will be performed by human responders, while in other cases at least some of the specified tests may be performed automatically (e.g., by automated responders that include automated testing functionality).

In the illustrated example, multiple responses are received that each indicate the results of a performed test. An example response of row 204*i* may be as follows:

Implementation code module: I7.2
Unit test code module: T7.1
Result: Failed
Errors: 13
Warnings: 6

The above response indicates that implementation code module I7.2 failed unit test T7.1, with 13 reported errors and 6 reported warnings. The responses may be formatted or otherwise presented in machine-readable format, such that they can be automatically read or otherwise processed. In particular, the results from the requested tests may be aggregated, and implementation code modules that pass all performed tests may be selected for integration into the final computer software being created. When multiple implementation code modules for a particular module definition pass all tests, various approaches may be used to select one of those implementation code modules, including by performing additional evaluation by, for example, subjective assessments based on human code inspection (e.g., to select the implementation module written in the "best" style and/or conforming most closely to development guidelines, etc.) and/or objective assessments based on the application of additional automated tests (e.g., created in response to further requests) until a single implementation emerges as a clear winner. In addition, when no single implementation code module for a particular module definition passes all of the tests, various approaches may be utilized, including generating additional requests to fix and/or otherwise refine one or more of the implementation code modules (e.g., the implementation code module with the fewest total errors). Alternatively, in some embodiments automated techniques may be used to synthesize multiple distinct implementation modules, such as by combining or otherwise using the functioning portions of multiple implementation code modules (e.g., selecting and combining procedures, functions, or methods from within multiple implementation code modules, where each selected portion is known to have passed all performed tests that exercise the selected portion).

After at least one received implementation code module has been selected for each module definition, the selected implementation code modules may be integrated into the final piece of computer software being created. Row 204*j* depicts a request to integrate multiple selected implementation code modules, which in this example include I1.2, I6.1 and I7.1, as well as one or more responses from human responder that each include an indication of a final integrated computer software system. An example request of row 204*j* may include the following text:

Integrate (build) and test the following implementation modules: I1.2, I6.1, and I7.1. Please also provide any build/install scripts and/or integration tests. Accepted responses will be rewarded $5.00.

Integration of multiple implementation code modules may include a variety of tasks related to logically and physically merging disparate implementations into a single software system. Such tasks may depend in some cases on the particular implementation technologies (e.g., high level programming languages, compilers, linkers, build managers, etc.) that are utilized. For example, integration may include developing configuration files for a given build system (e.g., Makefiles, project files, etc.). Other integration tasks may be related to testing the entire software system (as opposed to individual modules), such as integration testing (e.g., to determine whether all of the modules interact with one another correctly), performance testing and analysis, user interface testing (e.g., usability tests on human subjects and/or automated user interface tests), etc. Responses may be accepted based on a variety of factors, including subjective and/or objective evaluations performed automatically (e.g., by building and executing the software system) and/or manually (e.g., by inspections performed by one or more responders).

Various aspects of software development practices have been omitted from the above example for clarity. For example, after integration, further testing and tuning may occur, and depending on test results, particular modules may be modified to correct defects and/or optimize performance. In addition, after integration, various tasks related to release, deployment, and maintenance may be performed. For example, the computer software may be compiled for multiple different platforms (e.g., combinations of operating system and hardware), install/uninstall functionality may be developed (e.g., install scripts created), the computer software may be localized (e.g., user interface elements translated into different languages), maintenance may be performed (e.g., bug reports processed), etc.

Thus, as previously described, various automated techniques may be used to create computer software (such as to provide a solution to a specified problem) based on multiple interactions with multiple human responders, and the interactions with responders may occur in various ways.

Figure 4:
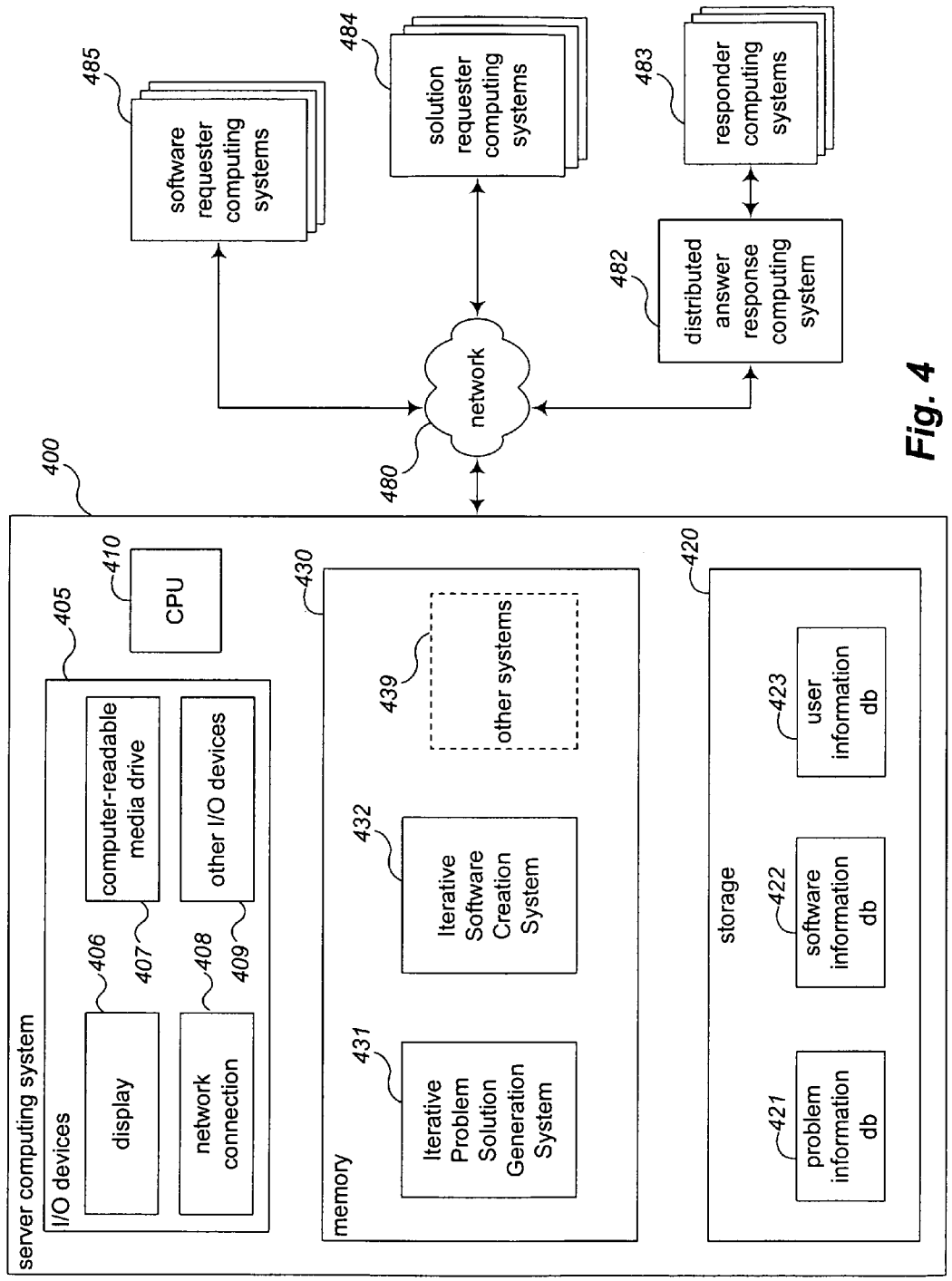
FIG. 4 is a block diagram illustrating a computing system suitable for executing example embodiments of a described iterative solution generation system and a described iterative software creation system.

FIG. 4 is a block diagram illustrating a computing system 400 suitable for performing various embodiments of the described techniques. The server computing system 400 includes a central processing unit ("CPU") 410, various input/output ("I/O") components 405, storage 420, and memory 430, with the illustrated I/O components including a display 406, a network connection 408, a computer-readable media drive 407, and other I/O devices 409 (e.g., keyboards, mice or other pointing devices, microphones, speakers, etc.).

In the illustrated embodiment, various software systems are executing in memory 430 in order to perform at least some of the described techniques, including an embodiment of an Iterative Problem Solution Generation system 431 and an embodiment of an Iterative Software Creation system 432. The executing systems 431 and 432 are generally referred to herein as iterative solution generation systems, although in some embodiments only one of the systems may be present, and in other embodiments the Iterative Software Creation system may be a specialized component or configuration of the Iterative Problem Solution Generation system. In addition, one or more optional other software systems 439 may also execute in memory 430 to provide various functionality, such as an optional payment processing system (e.g., if the iterative solution generation systems perform functionality in exchange for payment from solution requesters or software creation requesters and/or if the iterative solution generation systems provide payment to responders for at least some of the interactions with the responders), or such as an optional embodiment of a distributed answer response system (e.g., if that distributed answer response system operates in conjunction with the iterative solution generation systems, such as by being operated by the same entity). The systems executing in memory 430 may further use various data stored in storage 420. In this example embodiment, storage 420 includes multiple databases, including a problem information database 421, a software information database 422, and a user information database 423. The user information database may include information about users that make requests to the iterative solution generation systems (e.g., payment-related information, preferences, etc.) and/or about human responders with whom the iterative solution generation systems interact (e.g., payment-related information, preferences, qualifications, etc.).

The computing system 400 and its executing iterative solution generation systems may communicate with various other remote computing systems via a network 480 (e.g., the Internet, one or more cellular telephone networks, etc.), such as solution requester computing systems 484, software requester computing systems 485, and a distributed answer response computing system 482. For example, the Iterative Problem Solution Generation system 431 may receive indications of high-level problems from solution requester client computing systems 484, such as problems supplied by users of those client computing systems. To generate one or more detailed final solutions to an indicated high-level problem, the Iterative Problem Solution Generation system 431 communicates with the distributed answer response computing system 482 or similar system in the illustrated embodiment in order to perform interactions with multiple responders using responder computing systems 483, although in other embodiments the system 431 may instead interact directly with the multiple responders via those responder computing systems. As described in greater detail elsewhere, the Iterative Problem Solution Generation system 431 performs multiple interactions with the multiple responders in order to iteratively refine indicated problems until detailed final solutions may be generated. After sufficient refinement, the Iterative Problem Solution Generation system 431 provides one or more such detailed final detailed solutions for a problem to the solution requester computing system from which the problem was received, and may further in some embodiments makes some or all of the information about the final detailed solutions available to other users.

Data structures and information related to solution generation may be stored or otherwise represented in the problem information database 421. Such data structures may include refinements (e.g., proposed refineable solutions provided by the distributed answer response computing system 482), data related to the evaluation and/or categorization of refineable solutions (e.g., received ratings, ranking, and/or assessments; tabulations of such received data; descriptions of evaluation set membership; etc.), detailed solutions to previously presented high-level problems, etc. In some cases, the Iterative Problem Solution Generation system 431 may further use solutions previously generated and stored in the problem information database 421 in order to provide a final detailed solution to a solution requester user without using additional interactions with responders.

In the illustrated embodiment, the distributed answer response computing system 482 provides an interface to multiple responder computing systems 483. The distributed answer response computing system 482 is capable of providing responses to received requests, such as answers to questions and/or solutions to problems, based at least in part on actions of the responders. The responders may be human responders operating or interacting with the responder computing systems 483, or may be automated responder systems executing on the responder computing systems 483. Such computing systems 483 may include any devices capable of communicating over a network in order to receive requests and provide responses.

In a manner similar to the Iterative Problem Solution Generation system 431, the Iterative Software Creation system 432 may receive indications of computer software to be created from software requester client computing systems 485, such as indications of desired functionality or high-level architectures supplied by users of those client computing systems. To create corresponding computer software, the Iterative Software Creation system 432 interacts with the distributed answer response computing system 482 or similar system in order to perform interactions with multiple responders, although in other embodiments the system 432 may instead interact directly with the multiple responders via their responder computing systems. As described in greater detail elsewhere, the Iterative Software Creation system 432 performs multiple interactions with the multiple responders in order to iteratively define aspects of the computer software to be created until particular software code implementation modules may be created and integrated to form the computer software. After the requested computer software has been created, the Iterative Software Creation system 432 makes the created computer software available to the software requester computing system 485 that requested the computer software, and may further in some embodiments makes some or all of the information about the created software available to other users.

Data structures and information related to software creation may be stored or otherwise represented in the software information database 422. Such data structures may include items produced during the software creation, such as use cases, system and/or user requirements, project plans, test plans, human-readable and/or machine-readable specifications (e.g., Interface Description Language ("IDL") specifications), design documents (e.g., architecture diagrams, class diagrams, network diagrams, etc.), implementation code modules and/or test code modules (e.g., files containing source code and/or test scripts), test results (e.g., for purposes of evaluating implementation code), build files (e.g., Makefiles, project files, etc.), bug reports and/or resolutions, etc. In addition, such data structures may include data related to the evaluation and/or categorization of received responses (e.g., received ratings, ranking, and/or assessments; tabulations of such received data; descriptions of evaluation set membership; etc.), solutions to previously presented software development tasks, etc. In some cases, the Iterative Software Creation system 432 may further use computer software or related items that were previously created and stored in the software information database 422 in order to provide software creation results without using additional interactions with responders.

It will be appreciated that the illustrated computing systems are merely illustrative and are not intended to limit the scope of the present invention. Computing system 400 may be connected to other devices that are not illustrated, including through one or more networks such as the Internet or via the Web. More generally, a "client" or "server" computing system or device may comprise any combination of hardware or software that can interact and perform the described types of functionality, including without limitation desktop or other computers, database servers, network storage devices and other network devices, PDAs, cellphones, wireless phones, pagers, electronic organizers, Internet appliances, television-based systems (e.g., using set-top boxes and/or personal/digital video recorders), and various other consumer products that include appropriate inter-communication capabilities. In addition, the functionality provided by the illustrated systems may in some embodiments be combined in fewer systems or distributed in additional systems. Similarly, in some embodiments the functionality of some of the illustrated systems may not be provided and/or other additional functionality may be available.

In addition, while various items are illustrated as being stored in memory or on storage while being used, these items or portions of them can be transferred between memory and other storage devices for purposes of memory management and/or data integrity. Alternatively, in other embodiments some or all of the software systems may execute in memory on another device and communicate with the illustrated computing system via inter-computer communication. Some or all of the systems or data structures may also be stored (e.g., as software instructions or structured data) on a computer-readable medium, such as a hard disk, a memory, a network, or a portable media article to be read by an appropriate drive or via an appropriate connection. The system components and data structures can also be transmitted as generated data signals (e.g., as part of a carrier wave or other analog or digital propagated signal) on a variety of computer-readable transmission mediums, including wireless-based and wired/cable-based mediums, and can take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 5:
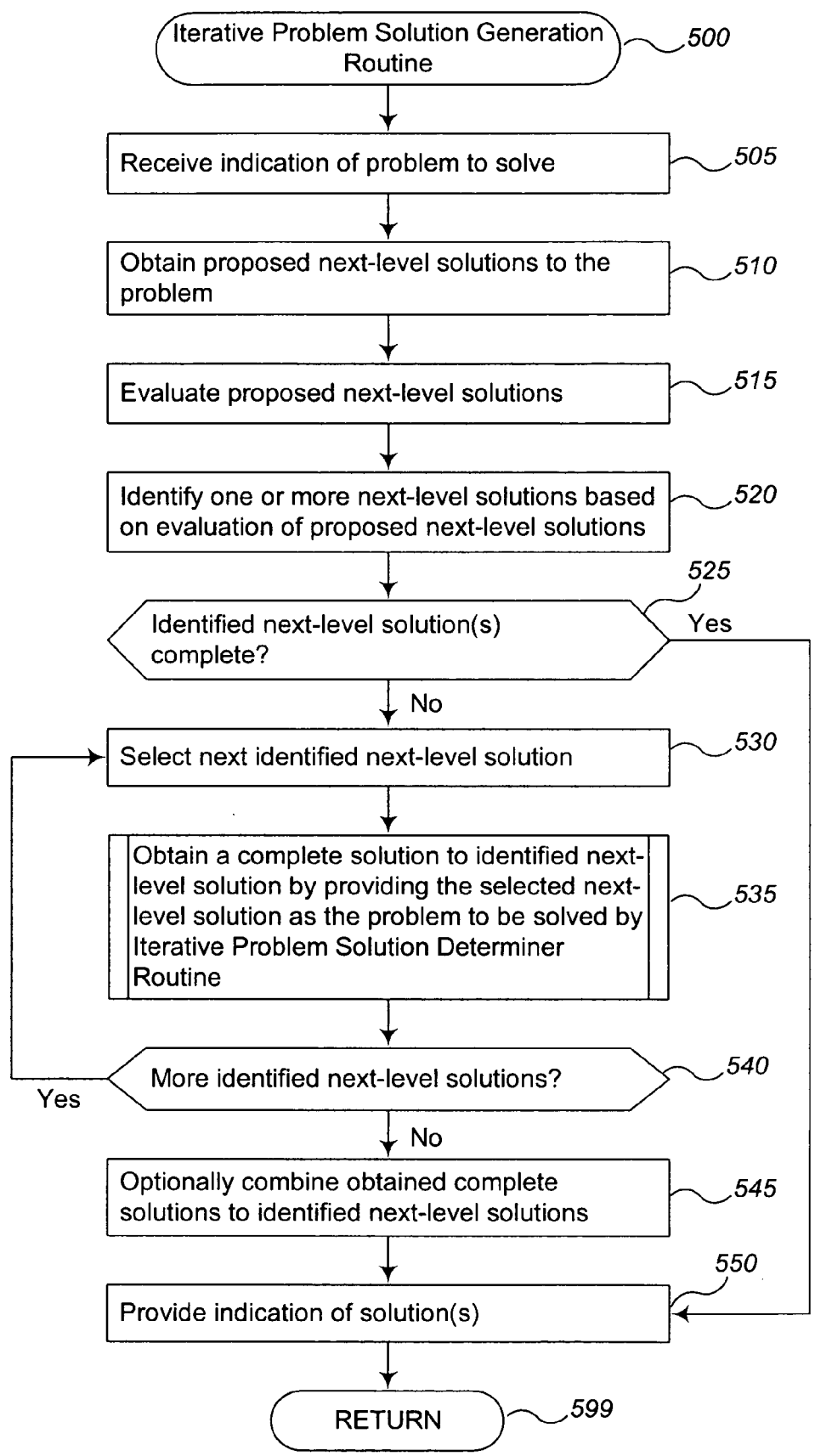
FIG. 5 is a flow diagram of an example embodiment of an Iterative Problem Solution Generation routine.

FIG. 5 is a flow diagram of an example embodiment of an Iterative Problem Solution Generation routine 500. The routine may be provided by, for example, execution of the Iterative Problem Solution Generation system 431 of FIG. 4, the Iterative Problem Solution Generation system 102 of FIG. 1A, and/or the Iterative Problem Solution Generation system 300 of FIG. 3. The routine provides solutions to indicated problems by performing multiple interactions with various responders to iteratively refine a problem until the refined problem is sufficiently detailed and non-abstract that a solution may be generated. As discussed in greater detail below, the illustrated embodiment of the Iterative Problem Solution Generation routine is described using recursive invocations for the purpose of simplification, but a variety of techniques may be used by which such a recursive routine may be implemented in a non-recursive manner.

The routine begins in step 505, where it receives an indication of a problem to solve. The routine may receive the indicated problem from an external user or computing system, such as one of the solution requester computing systems 484 of FIG. 4, or alternatively may receive the indicated problem from itself, as part of a recursive invocation in step 535 as described in greater detail below. In step 510, the routine refines the indicated problem in order to obtain proposed next-level solutions to the indicated problem. The proposed next-level solutions are obtained by interacting with one or more responders, such as via an intermediary distributed answer response system that provides an interface to the multiple responders. In step 515, the routine then evaluates the proposed next-level solutions in one or more ways, such as based at least in part on evaluations provided by one or more responders. In addition, evaluating the proposed next-level solutions may in some embodiments include initial categorization of the proposed next-level solutions by multiple responders, as described in greater detail elsewhere. In step 520, the routine then identifies one or more next-level solutions based on the evaluation performed in step 515, such as to select one or more of the highest-evaluated proposed next-level solutions.

In step 525, the routine then determines whether the identified next-level solutions are complete, such as based on feedback from one or more responders and/or on input from a solution requester user who supplied the problem in step 505. If it is determined that the identified next-level solutions are complete, the routine proceeds to step 550 to provide an indication of those next-level solutions, but otherwise proceeds to step 530 to select the next identified next-level solution for further refinement, beginning with the first. In particular, the routine performs a loop in steps 530-540 to refine each of the next-level solutions identified in step 520. In step 535, the routine obtains a complete solution to the selected next-level solution by providing the selected next-level solution as an initial problem to be solved to another instance of the Iterative Problem Solution Determiner routine in a recursive manner. During execution of that instance of the routine, the selected next-level solution may be further refined one or more times, including by performing additional recursive invocations of the Iterative Problem Solution Determiner routine, until a complete solution to each successive level of refinement is obtained and returned.

In step 540, the routine then determines whether there are more identified next-level solutions to refine. If so, the routine returns to step 530 to select a next of the identified next-level solutions, and otherwise proceeds to step 545. In step 545, the routine optionally combines the obtained complete solutions for each of the identified next-level solutions into a final detailed solution, such as for cases in which the identified next-level solutions reflect a decomposition of a higher-level problem into multiple sub-problems. After step 545, the routine proceeds to step 550 and provides an indication of the final detailed solution. This indication may be provided to, for example, a solution requester who supplied the initial problem, or instead to a prior instance of the Iterative Problem Solution Generation routine that invoked the current instance in a recursive manner in step 535. Next, the routine proceeds to step 599 and returns.

Figure 6:
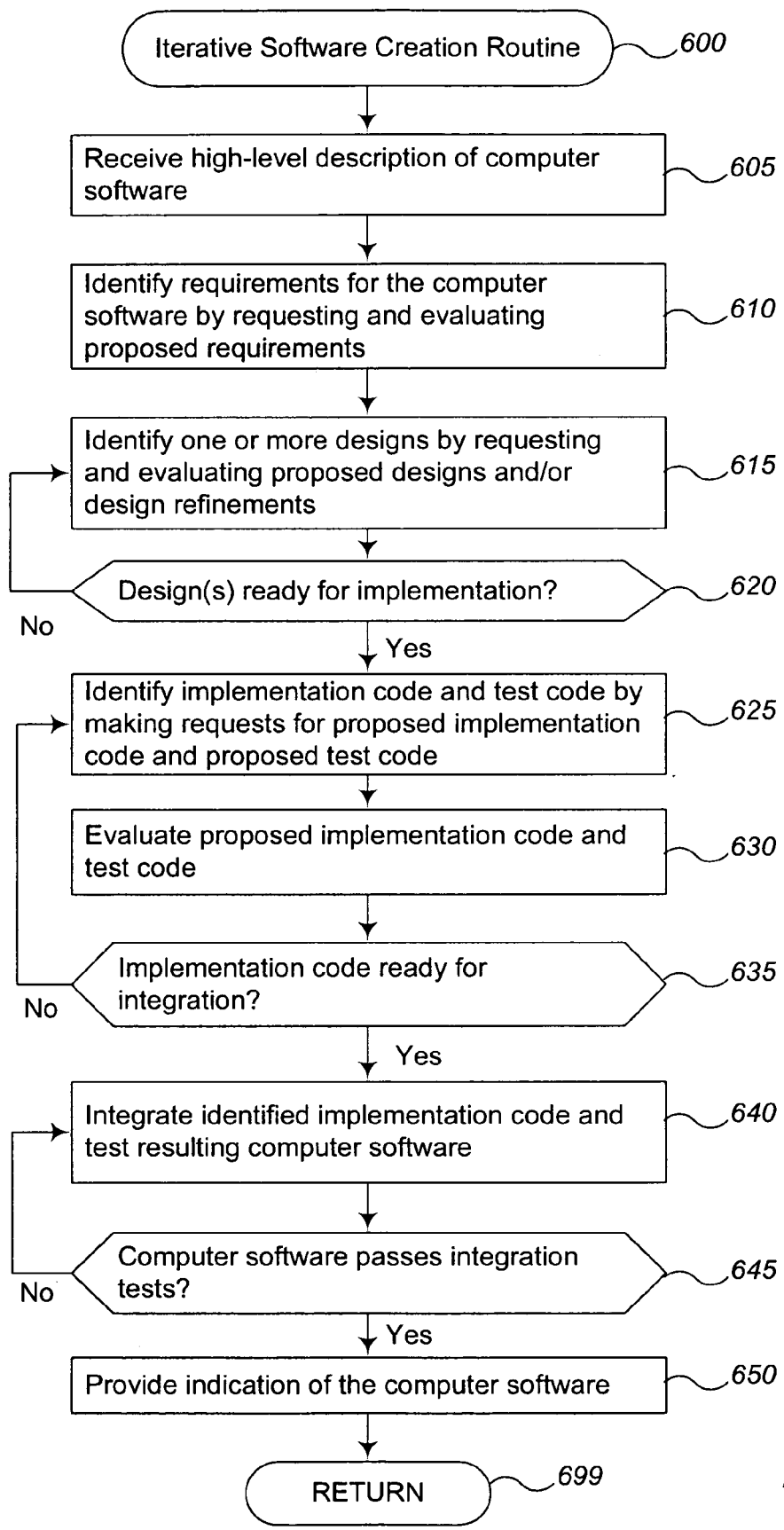
FIG. 6 is a flow diagram of an example embodiment of an Iterative Software Creation routine.

FIG. 6 is a flow diagram of an example embodiment of an Iterative Software Creation routine 600. The routine may be provided by, for example, the Iterative Software Generation system 432 of FIG. 4 and/or the Iterative Software Generation system described with respect to FIG. 2. The routine facilitates creation of computer software by performing multiple interactions with various responders to iteratively refine the definition of the software to be created until the refined definition is sufficiently detailed and non-abstract that implementation software code may be generated. This illustrated embodiment of the Iterative Software Creation routine is described in a procedural manner with a specified number of refinement steps, but in other embodiments may be implemented in a recursive manner similar to that described with respect to FIG. 5.

The routine begins in step 605, where it receives a high-level description of computer software to be created. The high-level description may be received, for example, from a software requester user or system, and may include various types of information as part of the description (e.g., a purpose, function, features, capabilities, and/or conceptual goal of the computer software to be created). In step 610, the routine identifies requirements for the computer software by obtaining proposed requirements from responders and by evaluating the proposed requirements, such as based on interactions with responders that occur via an intermediary distributed answer response system acting as an interface to the multiple responders. In addition, while illustrated here as a single step, the operations of step 610, and more generally of other steps of the routine that are based on information from responders, may involve numerous interactions with the responders, such as to perform one or more stages of refinement of the requirements or other types of information being obtained.

In steps 615 and 620, the routine next performs a loop to identify and iteratively refine one or more software designs to provide functionality in accordance with the identified requirements. In step 615, the routine initially identifies one or more initial designs by obtaining, evaluating and identifying one or more proposed designs, which may include interactions with the responders. In step 620, the routine then determines whether the identified one or more designs are ready for implementation, such as based on feedback from one or more responders and/or on input from a solution requester user who supplied the high-level description in step 605. For example, in some embodiments, responders who propose a design may indicate whether that design is ready for implementation. If it is determined in step 620 that the one or more identified initial designs are not ready for implementation, the routine proceeds to step 615 to perform further refinement of those identified designs. By performing steps 615 and 620 multiple times, designs may be successively refined until ready for implementation. When it is determined in step 620 that the one or more currently identified designs are ready for implementation (e.g., when designs for particular code modules have been specified), the routine proceeds to step 625.

In steps 625-635, the routine performs another loop to identify and iteratively refine implementation code to implement the one or more identified designs, as well as to identify and iteratively refine test code that verifies such implementation code against the identified designs. In particular, in step 625 the routine obtains initial proposed implementation code modules and proposed test code modules based on interactions with the responders. For example, step 625 may include making one or more requests to the responders that each include an indication of an identified design for which one or more implementation code modules and/or test code modules is to be provided, and receiving one or more proposed implementation code modules and/or test code modules for each request. In step 630, the routine evaluates received proposed implementation code modules and test code modules, such as by interacting with the responders to use test code modules to perform testing of corresponding implementation code modules, or instead by automatically performing such testing.

After the testing, the routine identifies one or more of the proposed implementation code modules based on the testing, and in step 635 determines whether the identified implementation code modules are ready for integration. This determination may be made in various ways, including based on whether the identified implementation code module passed all corresponding tests (e.g., generated no errors and/or no warnings) and/or was subjectively or objectively assessed by one or more responders to be ready (e.g., based on the implementation code module conforming to applicable standards). If it is determined in step 635 that the one or more identified implementation code modules are not ready for integration, the routine returns to step 625 to perform further refinement of those identified implementation code modules (e.g., to locate and fix defects discovered in the course of testing). By performing steps 625-635 multiple times, implementation code modules may be successively refined until ready for integration. When it is determined in step 635 that the one or more currently identified implementation code modules are ready for integration (e.g., when all identified errors have been removed), the routine proceeds to step 640.

In step 640, the routine proceeds to integrate the identified implementation code modules in order to produce resulting computer software, and optionally performs one or more tests of the resulting computer software. The integrating may be performed based on interactions with the responders or instead automatically, and may include linking, merging, conjoining, or otherwise consolidating implementation code logically or physically organized into modules, files, components, classes, or other units of modularity. Integration testing may include applying tests that operate on an entire system, including performance tests, user interface tests, etc. Integration tests may further be obtained in step 640 by making requests to responders to provide such tests. In step 645, the routine determines whether the computer software is complete, such as based on the computer software passing any available integration tests, satisfying any other specified criteria, and/or using feedback provided by responders and/or a user who provided the initial high-level description in step 605. If it is determined that the computer software does not pass the integration tests, the routine returns to step 640 to further refine the integrated computer software (e.g. to correct defects discovered in the course of testing). If it is determined that the computer software is complete, the routine proceeds to step 650 to make the computer software available to the user who provided the initial high-level description in step 605, and then proceeds to step 699 and returns.

As previously noted, a variety of types of problems may be solved and functionality provided using the previously described iterative refinement techniques. As one example, in some embodiments multiple responders may be used to organize a collection of information, such as by performing categorization, classification, grouping, or the imposition of other structure onto the collection. Information to be organized may be of virtually any type, and may include initial abstract problems to be solved, initial high-level descriptions of computer software to be created, and intermediate refinements that are produced when generating solutions to problems or creating computer software. For example, in the context of an Iterative Problem Solution Generation system, information to be organized may include multiple proposed refineable solutions to a given problem. In the context of an Iterative Software Creation system, information to be organized may include various responses provided by multiple responders, including use cases, system requirements, user requirements, test cases, implementations, etc.

While such organizing of information may provide benefits in any context, including as a stand-alone end-product (e.g., as a solution to a categorization or other dis-organization problem), such organization capabilities may provide additional benefits when used in conjunction with the Iterative Problem Solution Generation system and/or the Iterative Software Creation system. For example, in the software creation context, a request for requirements may result in a large number of proposed requirements. Some of these requirements may be similar (e.g., by having similar subject matter that is described in generally more or less detail) to each other or otherwise overlap, such that there may exist categories of related proposed requirements. In such situations, the best requirements within each category may be of particular use to identify and use, such as to provide appropriate breadth of functionality. Thus, as previously noted, in some embodiments the operation of the Iterative Problem Solution Generation system and/or the Iterative Software Creation system may include using categorization of information in various ways, such as to use responders to categorize some or all intermediate refinements that are to be evaluated in order to facilitate more useful evaluation.

In some embodiments, multiple successive interactions with multiple human responders may be used to provide structure for previously unorganized collections of information in various ways, such as by discovering categories in previously uncategorized collections of information. Initially, an unorganized collection of information includes multiple information items. The information items may be of various types, including proposed solutions, software development work products, etc. The information may also take various forms, including audio, images, and text. Next, the collection is decomposed (e.g., by random selection) into multiple subsets each including two or more information items. Then, each of the multiple subsets is presented to one or more responders, who are asked to group the information items into any number of groups as they determine appropriate. For example, a subset containing items A, B, C, D, and E may be grouped by one responder into two groups, [A, D] and [B, C, E]. The above-described decomposition and grouping may be performed multiple times. Varying subsets may be created, such that information items do not always appear with the same other information items in a subset.

After each grouping by a responder, the specified group memberships are tabulated so as to track co-occurrence of each information item with each other information item. For example, the number of times that information item A appeared in a group with each of information items B, C, D, and E may be tracked. Similarly, the number of times that information item B appeared in a group with each of information items A, C, D, and E may be tracked, and so on for the remaining items C, D, and E. After multiple rounds of grouping, probabilities may be calculated that reflect the likelihood that a particular information item is in the same group as another information item. Specifically, for each pair of information items, the probability that that those two items belong in the same group is the number of times that the two items appeared together in a group divided by the number of times the two items were presented in a subset. Categories may then be ascertained by identifying information items that co-occur with one another with a higher than pre-determined threshold probability. In addition, canonical examples for each category may also be determined. For example, for each discovered category, the item that was most often selected as appearing in a group with any other item in the category may be identified as a canonical example. Alternatively, the above-described distributed evaluation techniques may be utilized to select the "best" example item of all of the items in a given category.

Those skilled in the art will also appreciate that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are discussed in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A computer-implemented method for managing generation of solutions for problems via repeated interactions with multiple unrelated humans who generate successively more defined refinements of the problem, the method comprising:

identifying a group of multiple unrelated humans who are available to perform tasks that include supplying requested information;

receiving information from a user about an abstract problem for which a solution is desired, the abstract problem being such that the solution cannot be discerned without refinement to further define the problem, the receiving being performed by one or more configured computing systems;

automatically managing generation of the solution to the problem by, identifying a first group of one or more first refinements to the problem that provide additional definition of the problem to be solved, the identifying of the first group being performed by the one or more configured computing systems and including interacting with some of the multiple humans of the group to obtain multiple proposed first refinements and interacting with other of the multiple humans of the group to obtain evaluations of the multiple proposed first refinements, the one or more first refinements of the identified first group being a subset of the multiple proposed first refinements that is selected based at least in part on the evaluations of the multiple proposed first refinements;

determining by the one or more configured computing systems that the first refinements of the identified first group are not sufficiently defined to allow the solution to the problem to be discerned;

identifying a second group of one or more second refinements to the problem that each provide additional definition relative to at least one of the first refinements of the identified first group, the identifying of the second group being performed by the one or more configured computing systems and including interacting with some of the multiple humans of the group to obtain multiple proposed second refinements and interacting with other of the multiple humans of the group to obtain evaluations of the multiple proposed second refinements, the one or more second refinements of the identified second group being a subset of the multiple proposed second refinements that is selected based at least in part on the evaluations of the multiple proposed second refinements;

determining by the one or more configured computing systems that the second refinements of the identified second group are sufficiently defined to allow the solution to the problem to be discerned; and identifying one or more solutions to the problem that each are based on the definition provided by at least one of the second refinements of the identified second group, the identifying of the one or more solutions being performed by the one or more configured computing systems and including interacting with some of the multiple humans of the group to obtain multiple proposed solutions and selecting at least one of the multiple proposed solutions as the identified one or more solutions; and providing to the user the identified one or more solutions to the problem for use in implementing the identified solutions.

2. The method of claim 1 wherein one of the first refinements of the first group includes a sub-problem that may be solved to obtain a partial solution to the problem, and wherein at least one of the second refinements of the second group each includes a refinement of the sub-problem that provides the partial solution to the problem.

3. The method of claim 1 wherein one of the first refinements of the first group includes an abstract solution to the problem, and wherein at least one of the second refinements of the second group each includes a refinement of the abstract solution so as to provide a less abstract solution.

4. The method of claim 1 wherein the selecting of the at least one of the multiple proposed solutions as the identified one or more solutions includes interacting with some of the multiple humans of the group to obtain evaluations of the multiple proposed solutions and using the evaluations during the selecting.

5. The method of claim 1 wherein the determining that the second refinements of the identified second group are sufficiently defined to allow the solution to the problem to be discerned is based on feedback obtained from at least some of the multiple humans of the group.

6. The method of claim 1 wherein the managing of the generation of the solution to the problem includes obtaining feedback from the user for use with at least one of the determining that the first refinements of the identified first group are not sufficiently defined to allow the solution to the problem to be discerned, and of the determining that the second refinements of the identified second group are sufficiently defined to allow the solution to the problem to be discerned.

7. The method of claim 1 wherein the managing of the generation of the solution to the problem includes, after the interacting with some of the multiple humans of the group to obtain multiple proposed first refinements, interacting with one or more of the humans of the group to obtain categorization information for the multiple proposed first refinements, and wherein the obtained categorization information is used for at least one of selecting the one or more first refinements of the identified first group from the multiple proposed first refinements, of the determining that the first refinements of the identified first group are not sufficiently defined to allow the solution to the problem to be discerned, and of the identifying of the second group of second refinements that each provide additional definition relative to at least one of the first refinements of the identified first group.

8. The method of claim 1 wherein the abstract problem is related to at least one of a product to be developed, research to be performed, and computer software to be created.

9. The method of claim 1 wherein the automatic managing of the generation of a solution to a problem is performed to generate solutions to distinct problems for each of multiple users in exchange for payment from the user, and wherein, for each distinct problem, the automatic managing of the generation of the solution to that problem includes providing payments to humans of the group for performing tasks that facilitate the generation of the solution for that problem.

10. A non-transitory computer-readable medium whose contents configure a computing device to facilitate problem solving, by performing a method comprising:

receiving an indication of an abstract problem to be solved;

interacting with a first group of one or more of multiple responders who are available to provide responses in order to obtain one or more initial refinements to the problem such that the initial refinements are less abstract than the problem, the interacting with the first group being performed by the configured computing device;

interacting with a second group of one or more of the multiple responders in order to obtain one or more further refinements that are each based on at least one of the obtained initial refinements, the interacting with the second group being performed by the configured computing device;

interacting with a third group of one or more of the multiple responders in order to obtain one or more solutions that are each based on at least one of the obtained further refinements, the interacting with the third group being performed by the configured computing device; and providing at least one of the obtained solutions for use as at least part of the solution to the problem.

11. The non-transitory computer-readable medium of claim 10 wherein the multiple responders are part of a group of multiple humans who are unrelated to each other, and wherein the first, second and third groups of responders are each distinct.

12. The non-transitory computer-readable medium of claim 10 wherein the abstract problem lacks sufficient definition to allow a detailed final solution to the problem from being discernable without refinement of the problem, and wherein the provided at least one solutions are part of the detailed final solution to the abstract problem.

13. The non-transitory computer-readable medium of claim 10 wherein the computer-readable medium is a memory of a computing device.

14. The non-transitory computer-readable medium of claim 10 wherein the contents are instructions that when executed cause the computing device to perform the method.

15. A computing system configured to facilitate problem solving, comprising:
  one or more processors;
  a first component that is configured to, when executed by at least one of the one or more processors, identify multiple humans who are available to provide information; and
  an iterative problem solution generation system that is configured to, when executed by at least one of the one or more processors, and in response to an indication of a problem for which a tangible solution is not initially discernable,
    interact with one or more of the multiple humans to obtain one or more proposed refinements to the problem, and select at least one of the proposed problem refinements;
    interact with one or more of the multiple humans to obtain one or more proposed tangible solutions based on the selected problem refinements, and select at least one of the proposed tangible solutions; and
    provide the selected tangible solutions for use as at least part of the tangible solution to the problem.

16. The computing system of claim 15 wherein the first component is at least part of a distributed answer providing service distinct from the iterative problem solution generation system.

17. The computing system of claim 15 wherein the iterative problem solution generation system is further configured to, after the selecting of the at least one proposed problem refinements and before the obtaining of the one or more proposed tangible solutions, perform one or more additional interactions with the multiple humans in order to obtain one or more additional refinements to the problem, and wherein the obtaining of the one or more proposed tangible solutions is further based in part on the obtained additional problem refinements.

18. The computing system of claim 15 wherein the first component and the iterative problem solution generation system each includes software instructions for execution by the one or more processors of the computing system.

19. The computing system of claim 15 wherein the first component consists of a means for identifying multiple humans who are available to provide information, and wherein the iterative problem solution generation system consists of a means for, in response to an indication of a problem for which a tangible solution is not initially discernable, interacting with one or more of the multiple humans to obtain one or more proposed refinements to the problem, selecting at least one of the proposed problem refinements, interacting with one or more of the multiple humans to obtain one or more proposed tangible solutions based on the selected problem refinements, selecting at least one of the proposed tangible solutions, and providing the selected tangible solutions for use as at least part of the tangible solution to the problem.

20. The computing system of claim 15 wherein the iterative problem solution generation system is further configured to, before the interacting with the one or more humans to obtain the one or more proposed tangible solutions based on the selected problem refinements:
  identify the selected problem refinements as current sub-problems to be further refined; and
  perform one or more additional interactions with at least some of the multiple humans in order to obtain one or more further problem refinements based on the current sub-problems, to enable possible tangible solutions to the problem to be discerned from the further problem refinements.

21. The computing system of claim 15 wherein the interacting with the one or more humans to obtain the one or more proposed refinements to the problem includes providing an indication of the indicated problem as part of one or more questions and receiving the one or more proposed problem refinements in response, and wherein the interacting with the one or more humans to obtain the one or more proposed tangible solutions includes providing an indication of the selected problem refinements as part of one or more questions and receiving the proposed tangible solutions in response.

22. The computing system of claim 15 wherein the selecting of the at least one proposed problem refinements includes interacting with at least one of the multiple humans to obtain evaluations of the one or more proposed problem refinements and using the obtained evaluations as part of the selecting.

23. The computing system of claim 22 wherein the one or more humans from whom the proposed problem refinements are obtained are part of a first group having a plurality of the multiple humans, and wherein the at least one humans from whom the evaluations of the proposed problem refinements are obtained are a second group having a plurality of other of the multiple humans, the plurality of other humans of the second group being distinct from the plurality of humans of the first group.

24. The computing system of claim 23 wherein the one or more humans from whom the proposed tangible solutions are obtained are part of a third group having a plurality of the multiple humans, the humans of the third group not being part of the first group or of the second group, and wherein the selecting of the at least one proposed tangible solutions includes interacting with a fourth group having a plurality of the multiple humans to obtain evaluations of the proposed solutions and using the obtained evaluations as part of the selecting, the humans of the fourth group being distinct from the humans of the first, second and third groups.

25. The computing system of claim 15 wherein the iterative problem solution generation system is further configured to determine whether a tangible solution to the indicated problem is discernable from the selected problem refinements, the determining being based on at least one of input received from a solution requester user who provided the indication of the problem and of feedback received from a plurality of the multiple humans who are distinct from the one or more humans from whom the one or more proposed refinements to the problem are obtained.

26. The computing system of claim 15 wherein the iterative problem solution generation system is further configured to automatically determine whether a tangible solution to the indicated problem is discernable from the selected problem refinements, the determining being based on predetermined criteria that include at least one of a total elapsed time since receiving the indication of the problem, of a total amount of money spent as part of the interacting with the multiple humans to obtain proposed refinements to the problem and to obtain proposed tangible solutions, and of a total number of refinements that have been performed.

27. The computing system of claim 15 wherein the iterative problem solution generation system is further configured to provide tangible solutions to problems for multiple users in exchange for fees paid by the multiple users.

28. The computing system of claim 15 wherein the indication of the problem is received from a first user, and wherein the multiple humans are unaffiliated with the first user and are unaffiliated with each other.

29. The computing system of claim 15 wherein the problem is at least one of a product to be developed, of research to be performed, of an object to be designed, and of computer software to be created.

30. The computing system of claim 15 wherein the selecting of the at least one proposed problem refinements includes obtaining categorization information for the proposed refinements by interacting with at least some of the multiple humans, and wherein the selecting is based at least in part on the categorization information.

31. The computing system of claim 15 wherein the interacting with the one or more humans to obtain the proposed refinements includes obtaining categorization information for at least one of the problem and of the proposed refinements by interacting with at least some of the multiple humans, and wherein the interacting is based at least in part on the categorization information.

32. The computing system of claim 15 wherein the problem includes providing structure for an uncategorized collection of information that includes multiple information items, and wherein the tangible solution includes discovering multiple categories for the multiple information items.

33. The computing system of claim 32 wherein the interacting with the one or more humans to obtain the one or more proposed refinements to the problem includes obtaining information from each of a plurality of the multiple humans that indicates multiple groups created by the human, each created group including a distinct subset of the multiple information items, wherein the selecting of the at least one proposed problem refinement includes identifying one or more item combinations that each include two or more items grouped together in the created groups by multiple of the plurality of humans, the identified item combinations each representing a possible category that is one of the selected at least one proposed problem refinements, and wherein the selected at least one proposed tangible solutions are each a category for the multiple information items that includes at least one of the possible categories represented by the identified item combinations.

34. The computing system of claim 33 wherein the two or more items in each of the identified one or more item combinations are automatically determined based on the multiple groups created by the plurality of humans to have a likelihood of being part of a common category that exceeds a pre-determined threshold.

35. The computing system of claim 33 wherein the selecting of the at least one proposed tangible solutions includes automatically identifying an item that is a canonical example for the category of each of the selected at least one proposed tangible solutions based on the multiple groups created by the plurality of humans.

36. The computing system of claim 32 wherein the multiple information items include multiple items having a common format, the common format being at least one of images, text, and audio.

37. The non-transitory computer-readable medium of claim 10 wherein the multiple responders are multiple unaffiliated humans, wherein the second group includes a plurality of the multiple responders, and wherein the interacting with the second group includes interacting repeatedly with multiple sub-groups of the second group to iteratively obtain the further refinements.

38. The non-transitory computer-readable medium of claim 10 wherein the multiple responders are multiple humans, wherein the obtaining of the one or more further refinements includes interacting with at least one of the multiple humans to obtain evaluations of one or more proposed refinements from other of the multiple humans and using those obtained evaluations to select the obtained one or more further refinements from the proposed refinements, and wherein the obtaining of the one or more solutions includes interacting with at least one of the multiple humans to obtain evaluations of the one or more proposed solutions from other of the multiple humans and using those obtained evaluations to select the obtained one or more solutions.

39. The non-transitory computer-readable medium of claim 10 wherein the computing device operates on behalf of an iterative problem solution generation service that provides solutions to abstract problems for multiple users in exchange for fees paid by the multiple users.

40. The non-transitory computer-readable medium of claim 10 wherein the problem is at least one of a product to be developed, of research to be performed, of an object to be designed, and of computer software to be created.

41. The non-transitory computer-readable medium of claim 10 wherein the interacting with the one or more responders of the second group to obtain the further refinements includes obtaining categorization information for at least one of the problem and of the further refinements by interacting with at least some of the multiple responders, and wherein the interacting with the third group is based at least in part on the categorization information.

42. The non-transitory computer-readable medium of claim 10 wherein the problem includes providing structure for an uncategorized collection of information that includes multiple information items, and wherein the at least one obtained solution includes one or more categories discovered for the multiple information items.

43. The non-transitory computer-readable medium of claim 42 wherein the multiple responders are multiple humans, wherein the interacting with the second group to obtain the one or more further refinements includes obtaining information from each of a plurality of the multiple humans that indicates multiple groups created by the human, each created group including a distinct subset of the multiple information items, and includes identifying one or more item combinations that each include two or more items grouped together in the created groups by multiple of the plurality of humans, the identified item combinations each representing a possible category that is one of the obtained further refinements, and wherein the obtained one or more solutions are each a category for the multiple information items that includes at least one of the possible categories represented by the identified item combinations.

44. The non-transitory computer-readable medium of claim 43 wherein the two or more items in each of the identified one or more item combinations are automatically determined based on the multiple groups created by the plurality of humans to have a likelihood of being part of a common category that exceeds a pre-determined threshold.

45. The non-transitory computer-readable medium of claim 43 wherein the obtaining of the one or more solutions includes automatically identifying an item that is a canonical example for the category of each of the obtained solutions based on the multiple groups created by the plurality of humans.

46. The non-transitory computer-readable medium of claim 42 wherein the multiple information items include multiple items having a common format, the common format being at least one of images, text, and audio.

* * * * *